(12) United States Patent
Nohilly et al.

(10) Patent No.: US 8,944,542 B2
(45) Date of Patent: Feb. 3, 2015

(54) PRINTER FOR EDIBLE SHEETS

(76) Inventors: Colm Nohilly, Greystones (IE); Hugh Nohilly, Greystones (IE)

( * ) Notice: Subject to any disclaimer, the term of this patent is extended or adjusted under 35 U.S.C. 154(b) by 257 days.

(21) Appl. No.: 12/811,881

(22) PCT Filed: Jan. 7, 2009

(86) PCT No.: PCT/EP2009/050145
§ 371 (c)(1),
(2), (4) Date: Oct. 18, 2010

(87) PCT Pub. No.: WO2009/087181
PCT Pub. Date: Jul. 16, 2009

(65) Prior Publication Data
US 2011/0025735 A1    Feb. 3, 2011

(30) Foreign Application Priority Data
Jan. 7, 2008    (IE) .................................. S2008/0006

(51) Int. Cl.
B41J 3/00        (2006.01)
A21D 13/00       (2006.01)
A23G 3/28        (2006.01)
B41J 2/175       (2006.01)
B41J 3/407       (2006.01)
B41J 29/17       (2006.01)

(52) U.S. Cl.
CPC .............. *A21D 13/0087* (2013.01); *A23G 3/28* (2013.01); *B41J 2/17509* (2013.01); *B41J 3/407* (2013.01); *B41J 29/17* (2013.01)
USPC .......................................................... 347/2

(58) Field of Classification Search
USPC ................................................. 347/2, 4, 22
See application file for complete search history.

(56) References Cited

U.S. PATENT DOCUMENTS

| | | | | |
|---|---|---|---|---|
| 3,102,770 | A | * | 9/1963 | McKeegan .................. 346/140.1 |
| 4,831,389 | A | * | 5/1989 | Chan ............................... 347/86 |
| 5,927,702 | A | * | 7/1999 | Ishii et al. .................... 271/9.09 |
| 6,030,134 | A | | 2/2000 | Stewart |
| 6,319,530 | B1 | | 11/2001 | Stewart |
| 7,286,258 | B2 | * | 10/2007 | Schnoebelen et al. ........ 358/1.18 |
| 2004/0111326 | A1 | * | 6/2004 | Rock et al. ...................... 705/26 |
| 2006/0087686 | A1 | | 4/2006 | Anderson |
| 2007/0136214 | A1 | * | 6/2007 | Eskandari ..................... 705/408 |

FOREIGN PATENT DOCUMENTS

| | | |
|---|---|---|
| JP | 62161574 A | 7/1987 |
| JP | 10291675 A | 11/1998 |

OTHER PUBLICATIONS

International Search Report, dated Apr. 7, 2009, in international patent application No. PCT/EP2009/050145, 3 pgs.

* cited by examiner

*Primary Examiner* — Julian Huffman
(74) *Attorney, Agent, or Firm* — Tutunjian & Bitetto, P.C.

(57) ABSTRACT

The present inventions relates to An ink-jet printer for printing on an edible substrate, the printer comprising a guide roller for guiding the substrate through the printer and a print head for printing on the substrate, the print head being mounted adjacent the guide roller so as to be movable in a reciprocating manner substantially parallel to the guide roller characterized in that the print head mounts a roller cleaning apparatus which engages the guide roller as the print head reciprocates. This prevents a build-up of residue from the edible substrate on the guide rollers, thus providing improved performance and reliability. A method of operating the printer in conjunction with a user terminal is also disclosed.

2 Claims, 28 Drawing Sheets

(a)          (b)

PRINTER FOR EDIBLE SHEETS

RELATED APPLICATIONS

The subject application is a U.S. National Stage application of International Application No. PCT/EP2009/050145, filed on 07 Jan. 2009, which claims the priority of Irish Patent Application No.: S2008/0006, filed on 07 Jan. 2008, the contents of which are herein incorporated by reference in its entirety.

The present invention relates to an ink-jet printer for printing on an edible substrate, the printer comprising a guide roller for guiding the substrate through the printer and a print head for printing on the substrate, the print head being mounted adjacent the guide roller so as to be movable in a reciprocating manner substantially parallel to the guide roller.

It is well known to use a printer, typically an ink-jet printer, to print images onto edible substrates, wherein the edible substrate is a form of sugar paper, corn-starch paper or other form of edible paper and the ink used in the printer is, in fact, food colouring. Such images are often used for decorating cakes, for example where a picture of the person celebrating his or her birthday is printed on the top of the birthday cake.

In general, standard inkjet printers are used for printing on edible substrates, however some modification is generally required so as to adapt the printer for use with the new materials. Inkjet printers generally comprise a paper guide comprising a number of rollers for guiding a sheet of paper through the printer. The sheet of paper will pass between an upper and lower set of rollers and a print head comprising a number of ink cartridges moves over the sheet of paper. In replacing the sheet of paper with a sugar paste edible substrate, problems may arise due to the characteristics of the sugar paste. If the sheet of sugar paste is too moist it will be sticky and will adhere to the roller as the sheets progresses. This results in a reduced quality printed image as the surface of the edible substrate, which is typically smooth, becomes uneven and irregular and will therefore not receive the ink in the intended manner. Additionally, sugar paste adhering to the rollers can also result in clogged rollers, which would result in a loss of the ability to progress the substrate through the printer and could in turn lead to printer failure.

Additionally, if a starch-based paper or substrate is used, such as cornstarch, a floury residue is present on the sheets. Depending on humidity and other factors, this residue can also build on the roller mechanisms and cause the above-mentioned problems.

One method that has been proposed so as to adapt a standard inkjet printer for use with an edible substrate is to provide a backing sheet having a central section coated with edible substrate and borders which are not coated. The rollers in the printer which would be in contact with the central area of the substrate are removed so that no roller will be in contact with a sugar paste area of substrate. This method has a number of disadvantages associated therewith. For example, without the central roller, the central section of the substrate tends to lift in the printer, resulting in clogged or otherwise damaged rollers and the substrate coming into contact with the printhead mechanism. These factors will result in reduced print quality and may eventually result in printer failure.

It is an object therefore of the present invention to provide a printer for printing on an edible substrate the performance of whose guide rollers will not become compromised by the materials of the edible substrate.

STATEMENTS OF INVENTION

According to the invention there is provided an ink-jet printer for printing on an edible substrate, the printer comprising a guide roller for guiding the substrate through the printer and a print head for printing on the substrate, the print head being mounted adjacent the guide roller so as to be movable in a reciprocating manner substantially parallel to the guide roller characterised in that the print head mounts a roller cleaning apparatus which engages the guide roller as the print head reciprocates.

In this way, the roller cleaning apparatus will remove from the guide roller any undesired residue of the edible substrate. This cleaning action will take place with each line of print that the print head lays down, therefore ensuring that minimal residue, if any, will build up on the guide rollers. This will in turn ensure that print quality does not deteriorate overtime and that the guide roller does not become clogged. The guide roller will therefore continue to operate at, or close to, optimal performance and will not be hindered in its operation by any build-up of material.

In one embodiment of the invention there is provided a printer in which the roller cleaning apparatus comprises a brush. This is a particularly effective and efficient manner of providing a reliable roller cleaning apparatus.

In another embodiment of the invention there is provided a printer in which the roller cleaning apparatus is demountable. In this way, the roller cleaning apparatus can be removed easily for cleaning or replacement and can also be removed if it is necessary to access other parts of the printer.

In a further embodiment of the invention there is provided a printer in which the guide roller comprises a plurality of collinear, spaced-apart rollers. This is a particularly efficient way of providing guide rollers for use with an edible substrate such as sugar paste.

In an alternative embodiment of the invention there is provided a printer comprising an additional roller cleaning apparatus mounted adjacent to the guide roller and engaging therewith. In this way, the guide roller is being cleaned constantly by the additional roller cleaning assembly, thereby further reducing the risk of clogging of the roller and the associated disadvantages.

In an embodiment of the invention there is provided a printer further comprising an exit roller and an exit tray, wherein the exit tray is positioned on the outside of the printer, adjacent the exit roller at substantially the same vertical height as the exit roller. In this way, the edible substrate will remain substantially flat as it exits the printer. In printers having a lower exit tray, the substrate tends to pivot downwards as it exits the printer, which causes the trailing end of the substrate to lift upwards within the printer. This can result in a breakage of the substrate or, in some cases, the substrate will touch against the print head. This can damage the image printed on the substrate and also possibly damage the print head itself.

In one embodiment of the invention there is provided a printer in which the print head comprises a plurality of ink cartridges and the printer is connected to an ink delivery system comprising a plurality of ink reservoirs, each in fluid communication with one ink cartridge. In this way, it is not necessary to remove the ink cartridges from the printer to ensure a continued supply of ink to the print head. It is sufficient to ensure that the reservoirs have sufficient ink, which is less complicated than regularly opening the printer to replace the ink cartridges. It is therefore easier for employees to operate the system. Furthermore, the use of ink reservoirs reduces the frequency at which the printer must be opened for maintenance, thereby reducing the possibility of dust or other contaminants entering the printer and impairing its operation. Finally, when changing an ink cartridge, there is a danger that air bubbles may be introduced into the ink supply system of the printer which would result in reduced print quality, and possible print head failure.

In another embodiment of the invention there is provided a printer in which at least one ink reservoir comprises an ink level sensor. In this way, the ink delivery system can monitor the levels in the reservoirs and thereby generate a visual or audible alarm when the reservoirs need to be re-filled.

In a further embodiment of the invention there is provided a printer in which the ink level sensor is connected to a communications means for transmitting level status information to a remote server. In this way, the remote server can automatically order the ink to be re-supplied to the location of the printer.

According to the invention there is provided a sheet for use with the printer of any previous claim comprising a backing sheet having an edible substrate applied thereto, wherein the edible substrate partially covers the backing sheet such that a deep border is left uncovered at the leading edge of the sheet. This provides a more reliable operation of the printer than if an edge having an edible substrate thereon is fed into the printer first. This is due to the fact that the rollers can have difficulty grasping the thicker sheet comprising the backing sheet and edible substrate. Furthermore, the deep border at the leading edge of the sheet remains flexible and is therefore able to be flipped forward by the paper feed mechanism within the printer. Additionally, the deep border of the sheet is already firmly held in place by the rollers by the time the section comprising the edible substrate enters the printer. This reduces slippage of the edible substrate within the printer and therefore improves print quality. Finally, the use of a deep border at the leading edge uncovered by edible substrate on the sheet reduces the occurrence of the edible substrate separating from the backing sheet, as the backing sheet is bent towards the edible substrate by the rollers within the printer, thereby providing improved adhesion between the two.

In a further embodiment there is provided a sheet in which the deep border has a paper label applied thereto. In this way, the paper label provides extra rigidity to the deep border of sheet when the sheet is loaded vertically into the input paper tray of the printer. This reduces the chances of the sheet buckling in the input paper tray. Additionally, the label can have customer order details relating to the printed edible substrate printed thereon.

According to the invention there is provided a printing system for printing on an edible substrate comprising the printer of any preceding claim wherein the printing system further comprises a customer terminal, the customer terminal having means for receiving an image to be printed and instructing the printer to print the image.

In this way, a customer wishing to customise a cake or other suitable item of confectionary may upload the desired picture to the customer terminal using the means for receiving an image and the terminal will then transmit that image to the printer for printing on an edible substrate.

In an alternative embodiment of the invention there is provided a printing system in which the terminal further comprises printer monitoring means and communication means for communication with a remote central server. In this way, the customer may upload a picture at a remote location and transmit the desired image to the remote central server, which will then transmit the image to a terminal adjacent to the desired recipient of the item of confectionary, where image is printed on an edible substrate. The edible substrate printed with the image is placed on a suitable item of confectionary, which is then delivered to the desired recipient.

According to the invention there is provided a printing method for printing on an edible substrate in a system comprising the printer of any preceding claim and further comprising a customer terminal having a database, image memory, list memory, print queue memory, a communications server, means for receiving an image to be printed and wireless communications means; and wherein the printer further comprises a communications client, wireless communications means, a user interface having a screen and data entry means; wherein the steps of the method comprise the terminal receiving an image to be printed and assigning a unique ID to that image;

storing the image in image memory, storing the unique ID in the database and also in list memory;

the communications client monitoring list memory via interaction with the communications server;

a user selecting a unique ID from list memory using the user interface of the printer, the communications client copying the selected unique ID to the print queue memory, the communications server monitoring the print queue memory and, on recognizing an update to the print queue memory, reading the unique ID stored in print queue memory, retrieving the image associated with that unique ID from image memory, transmitting that image to the printer for printing and deleting the unique ID from print queue memory.

This method allows for efficient and simple operation of the printing system. The simple is easy to use for both the customer and the user in the bakery or similar setting. The method allows the user to select an image for printing through interaction with the printer itself and without having to interact physically with the customer terminal. This allows the user to remain in the work area of the bakery or other location of the system and to ensure that the printer is ready to print before an image is sent for printing. Additionally, the arrangement of the communications server and communications client allows the transfer of other information, such as status information between the printer and the customer terminal.

According to the invention there is provided a method of modifying an ink-jet printer comprising a plastic casing, paper feed roller springs, print head and ink cartridges such that it can be used for printing on an edible substrate comprising the steps of removing the plastic casing;

replacing the paper feed roller springs with springs of lesser tension;

attaching a roller cleaning apparatus to the print head;

providing a clear path of movement for the modified print head; and fitting a stainless steel housing to the printer.

In this way, a standard ink-jet printer can be effectively and efficiently modified for use in printing on an edible substrate.

In an alternative embodiment of the invention there is provided a method comprising the additional step of connecting the ink cartridges to ink reservoirs having level sensors adapted to generate an alarm when a low ink level is detected. In this way, it is not necessary to regularly change ink cartridges, it will suffice to replenish the ink wells.

In an another embodiment of the invention there is provided a method comprising the additional step of fitting paper input and paper exit trays to the stainless steel housing. In this way, paper trays adapted for use with an edible substrate can be used.

DETAILED DESCRIPTION OF THE INVENTION

The invention will now be more clearly understood from the following description of an embodiment thereof, given by way of example only, with reference to the accompanying drawings in which.

Figure 5:
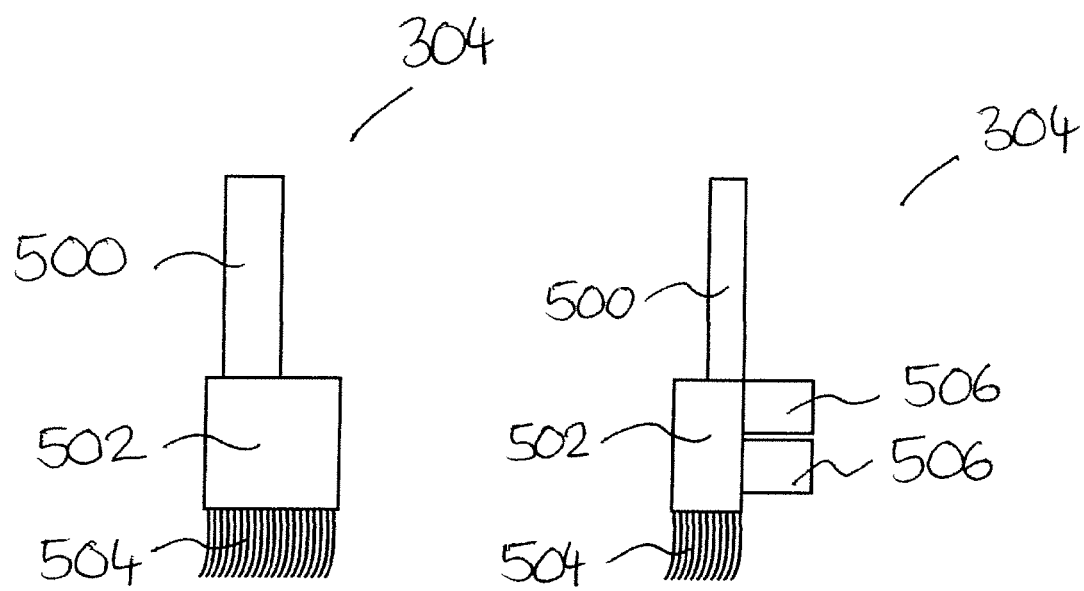
Figure 5:
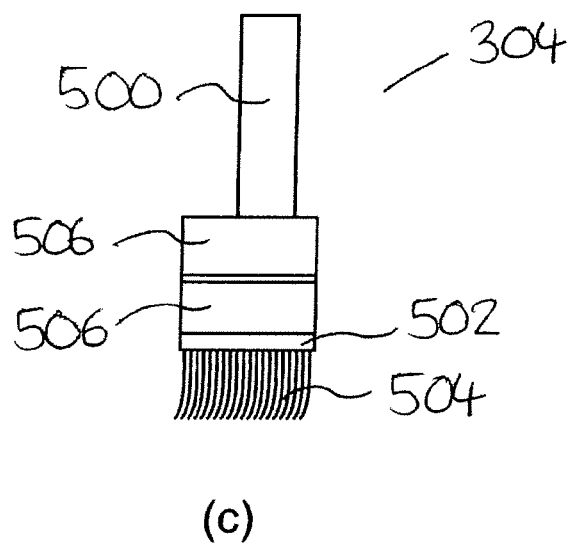
Figure 6:
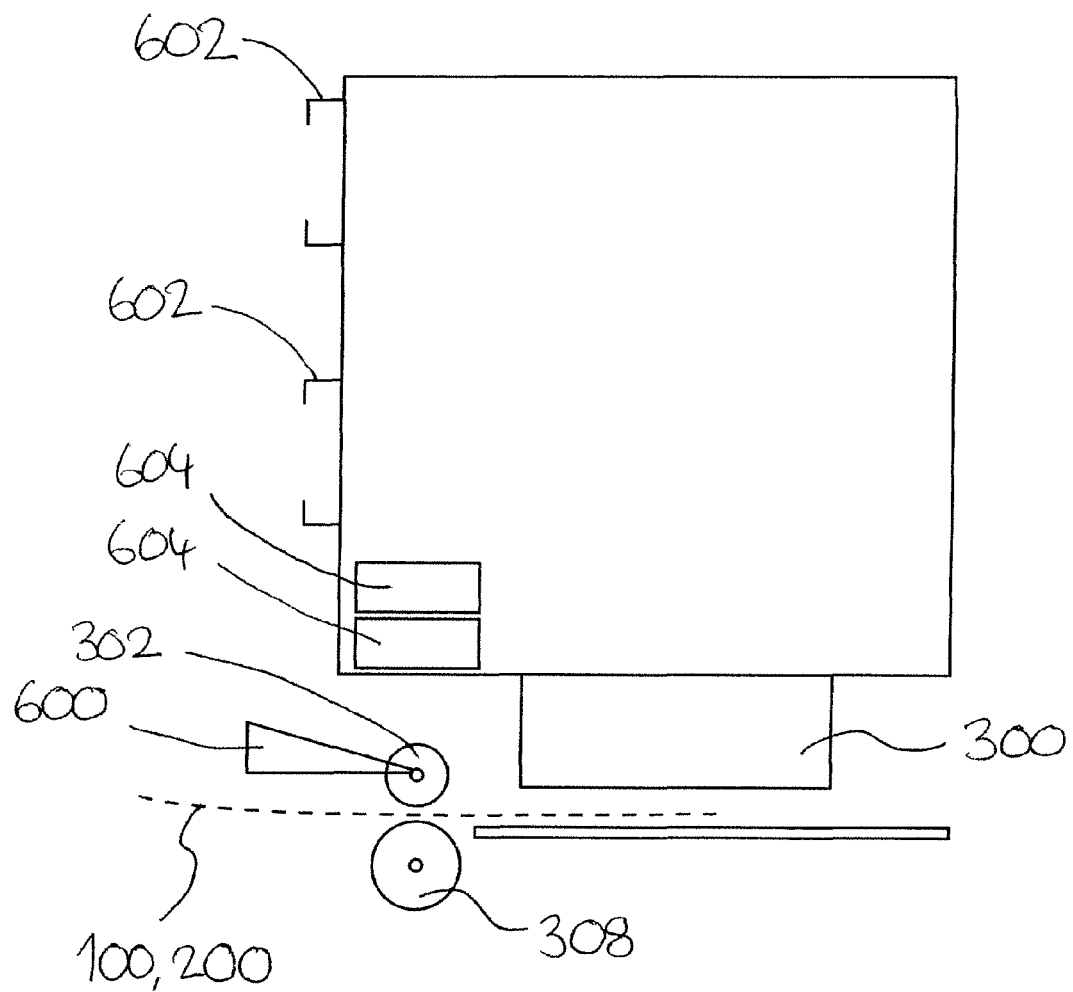
Figure 8:
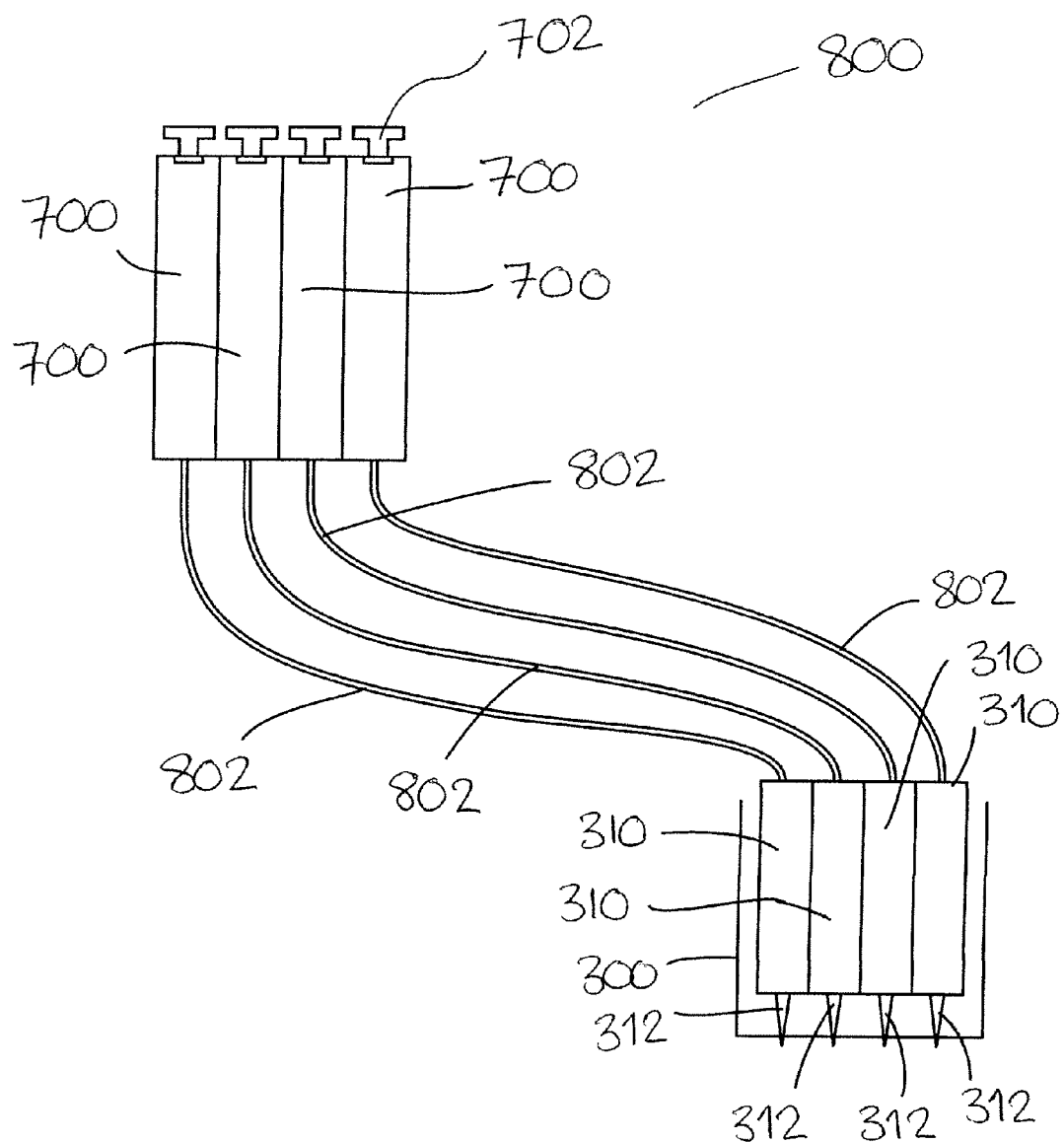
Figure 9:
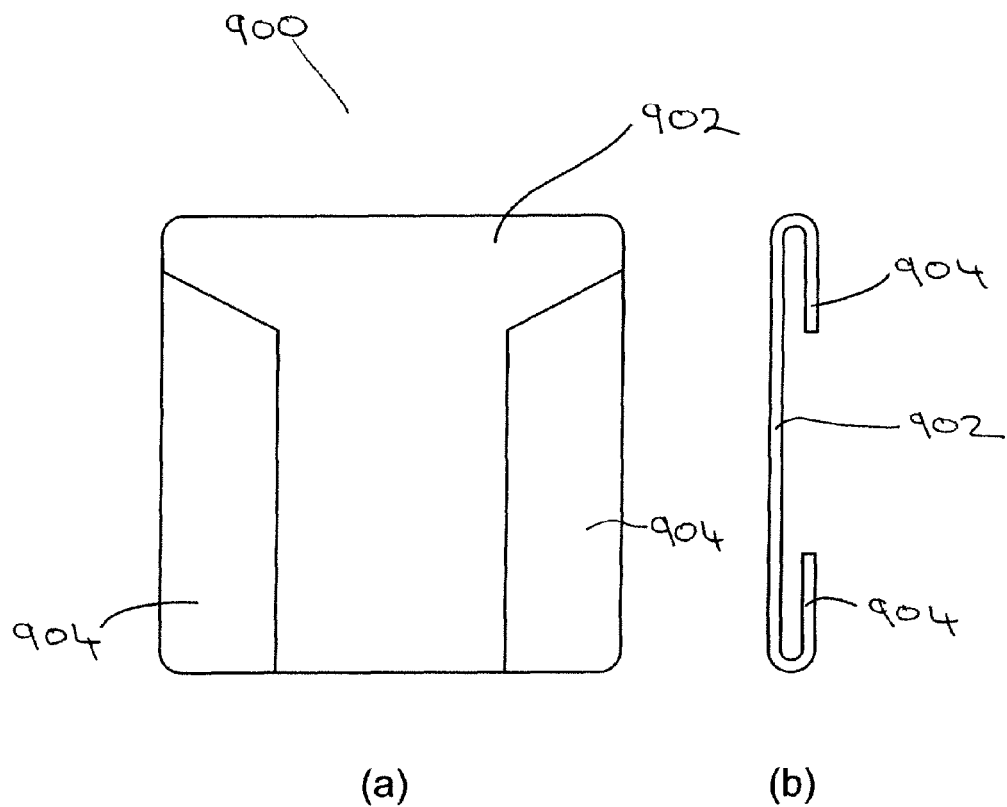
Figure 10:
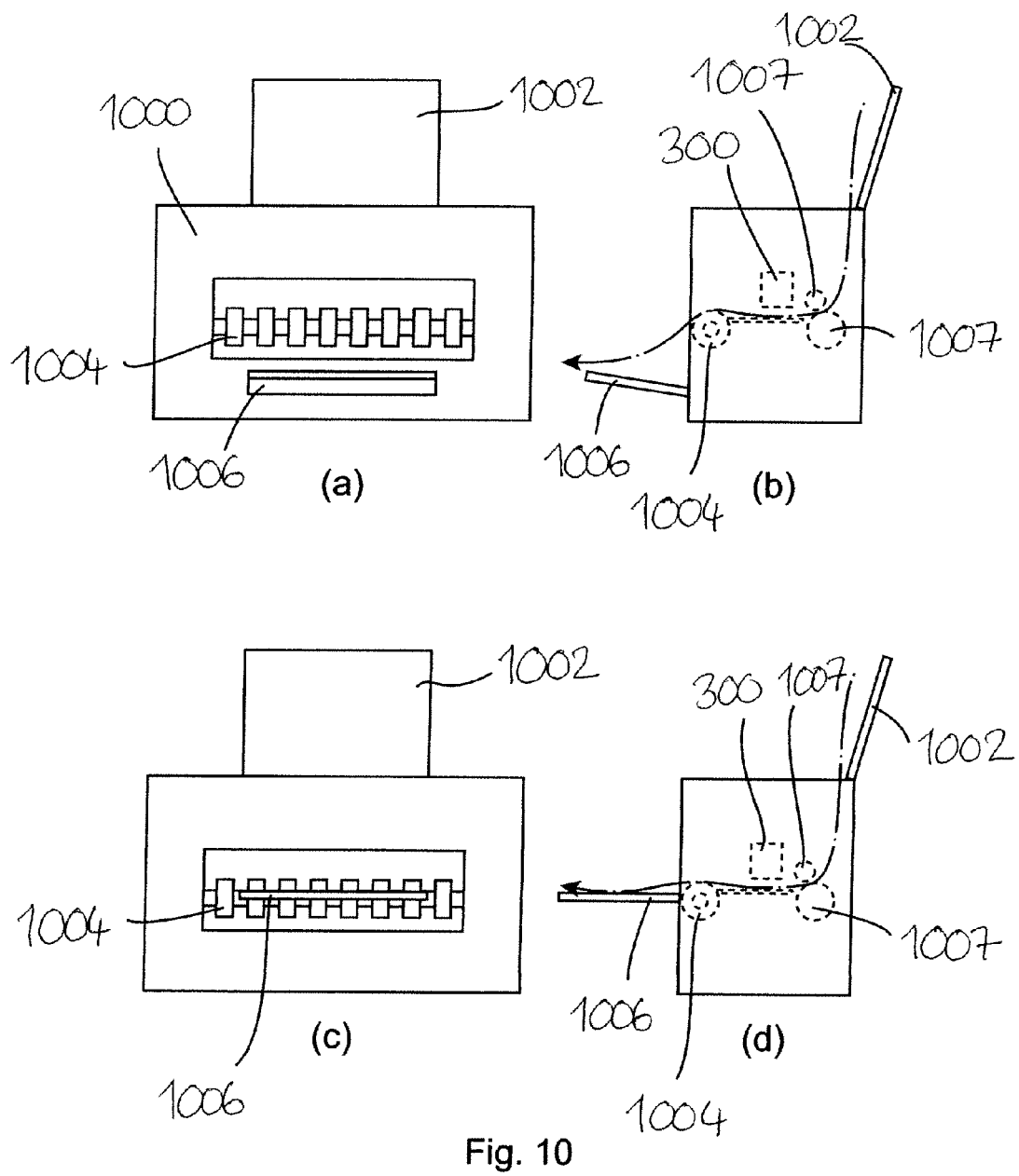
Figure 11:
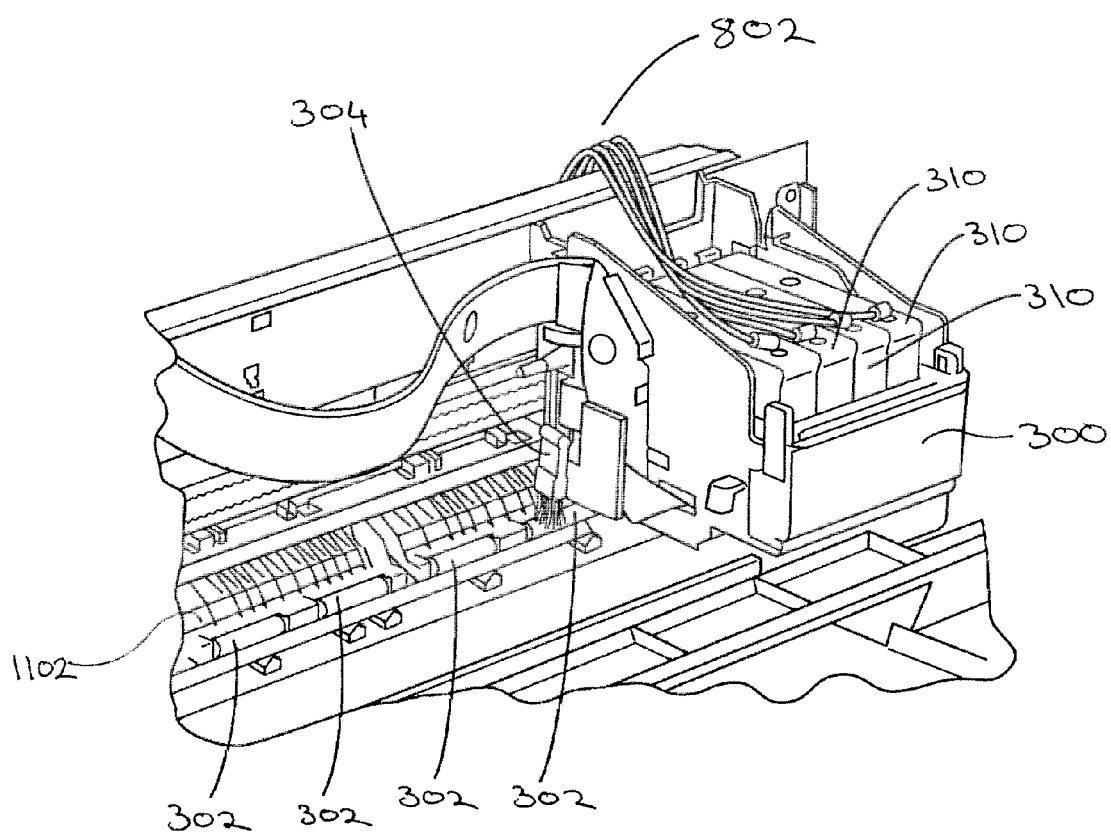
Figure 12:
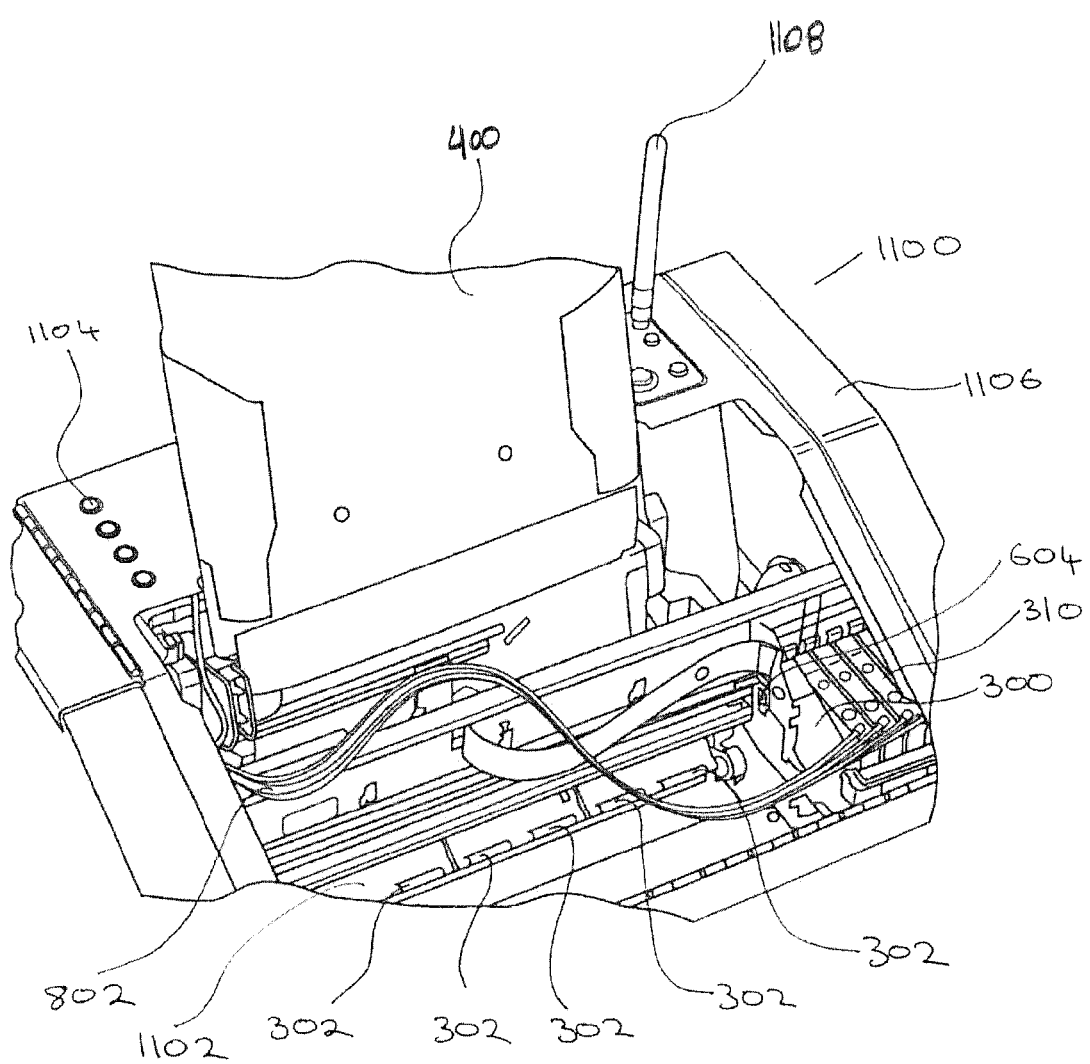
Figure 13:
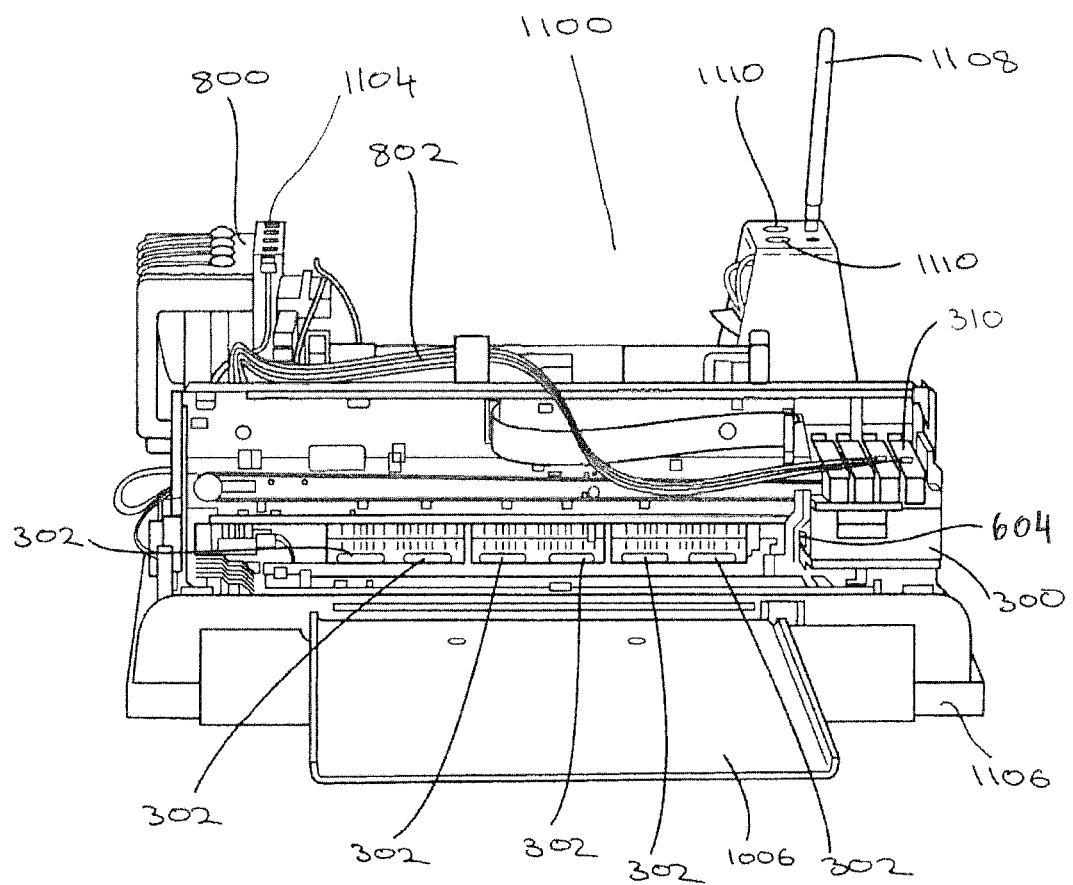
Figure 14:
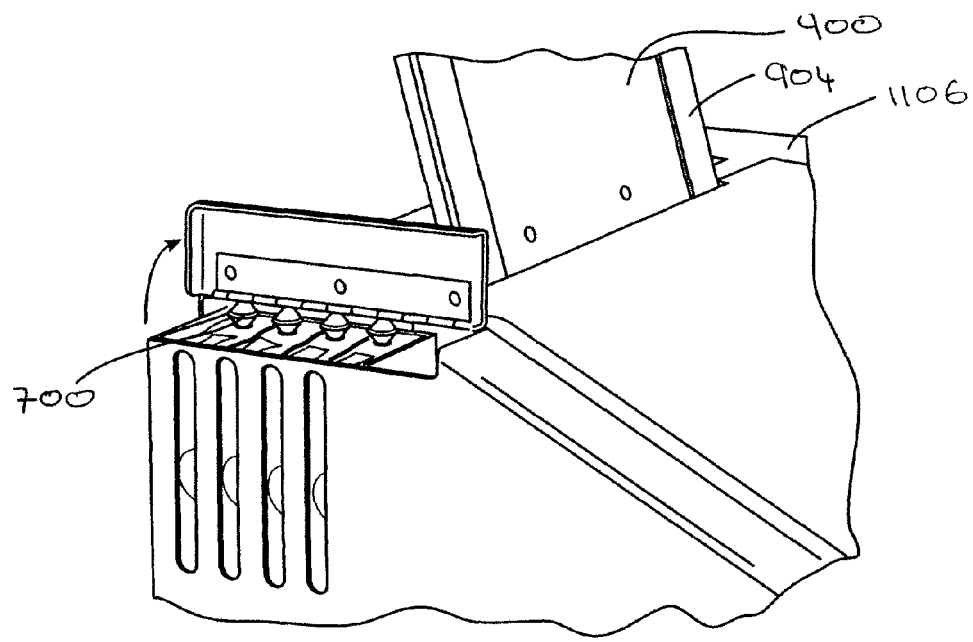
Figure 15:
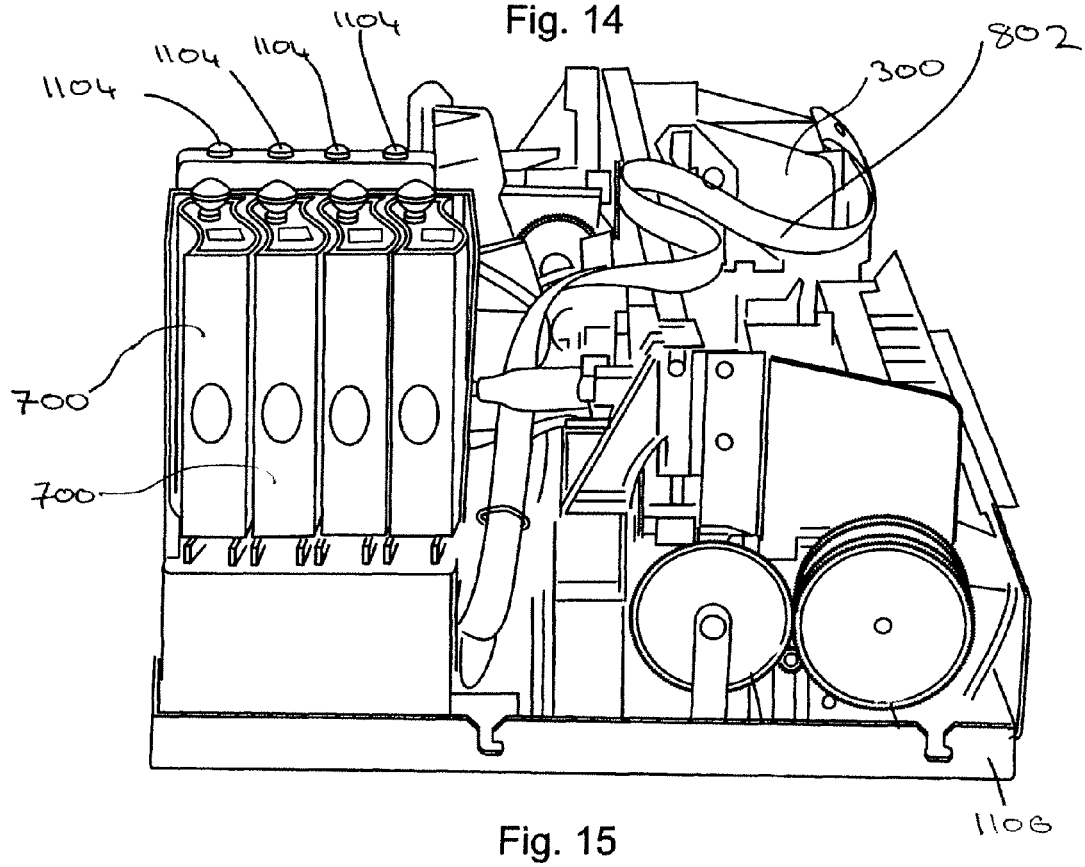
Figure 16:
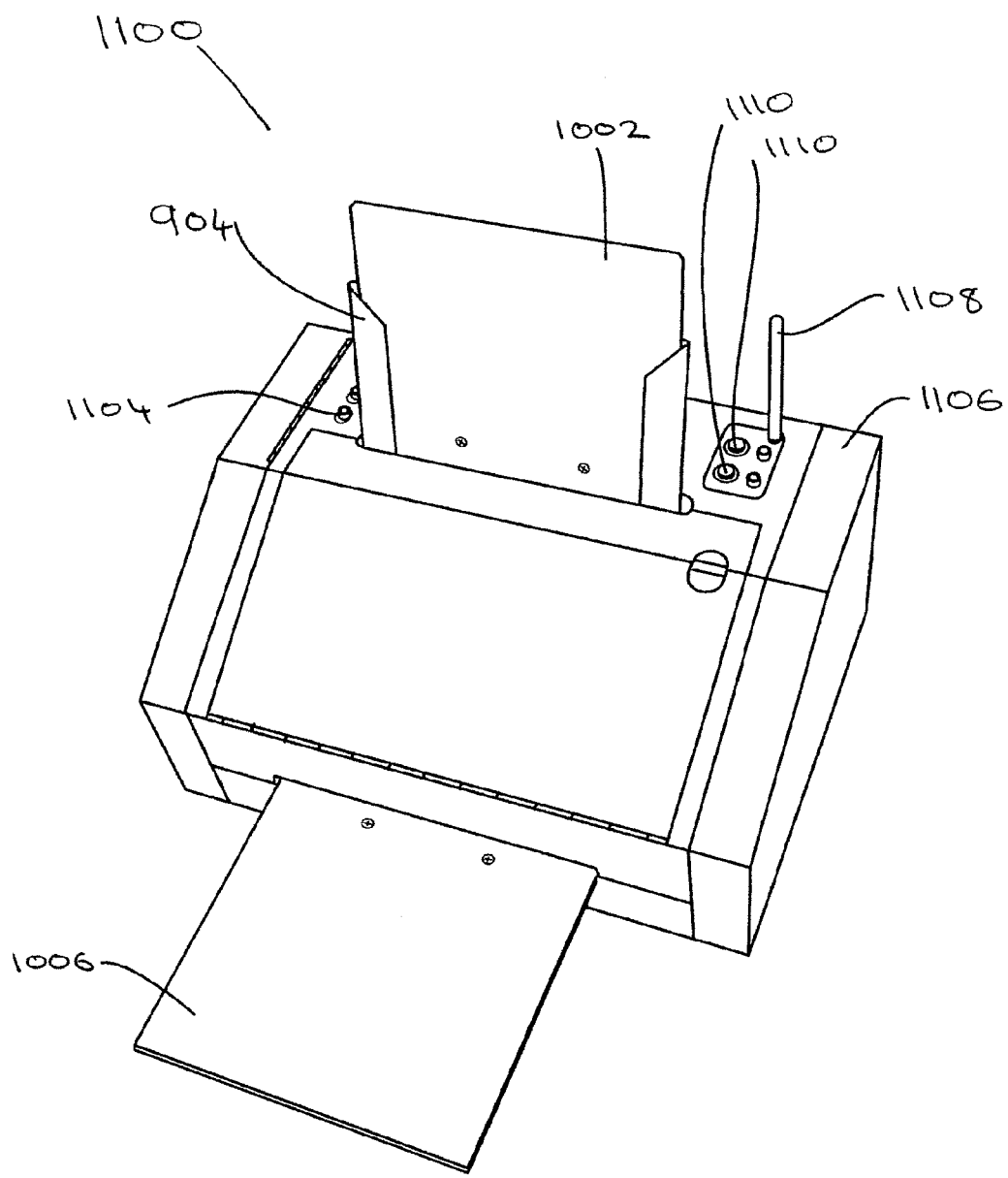
Figure 17:
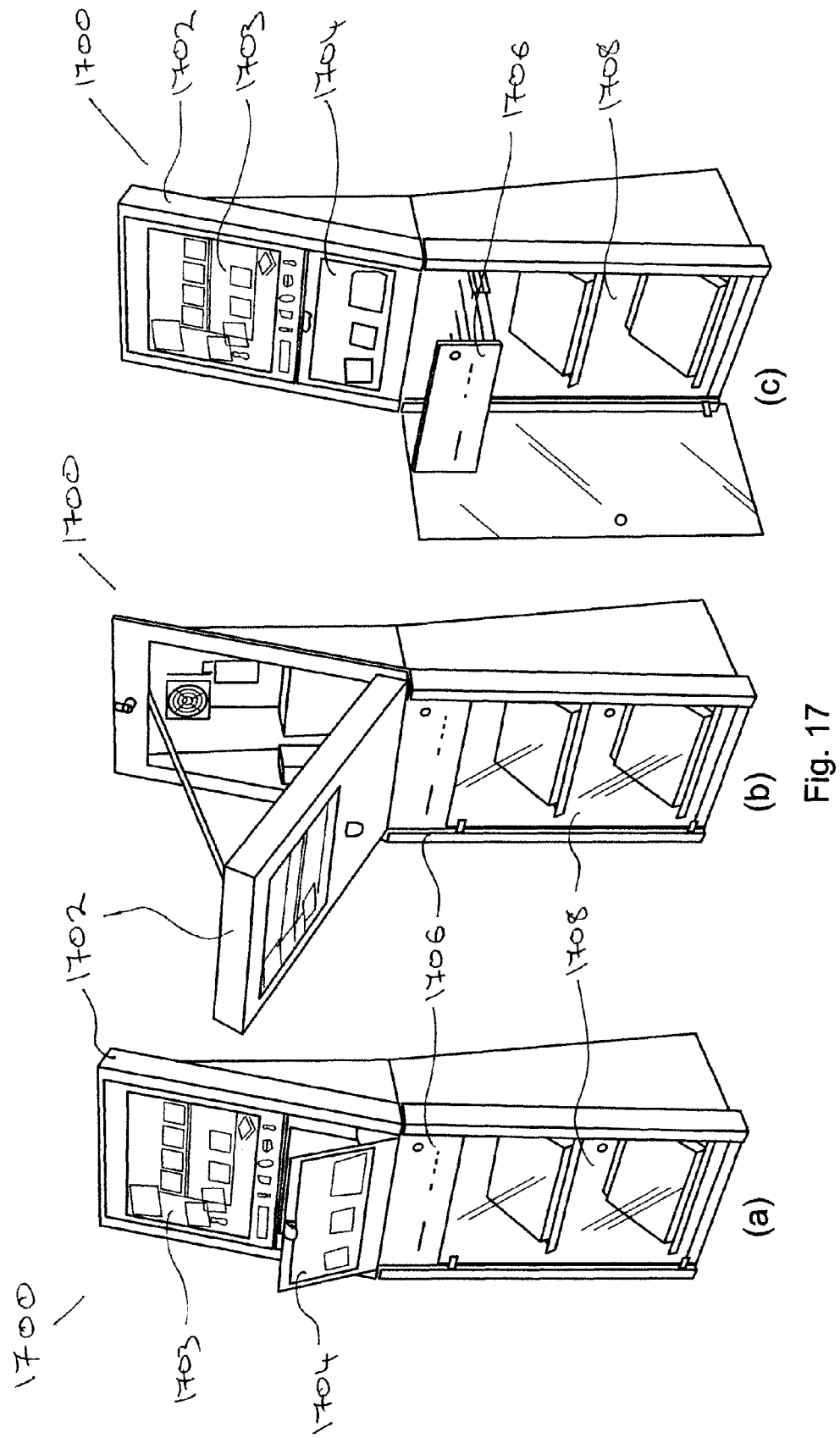
Figure 18:
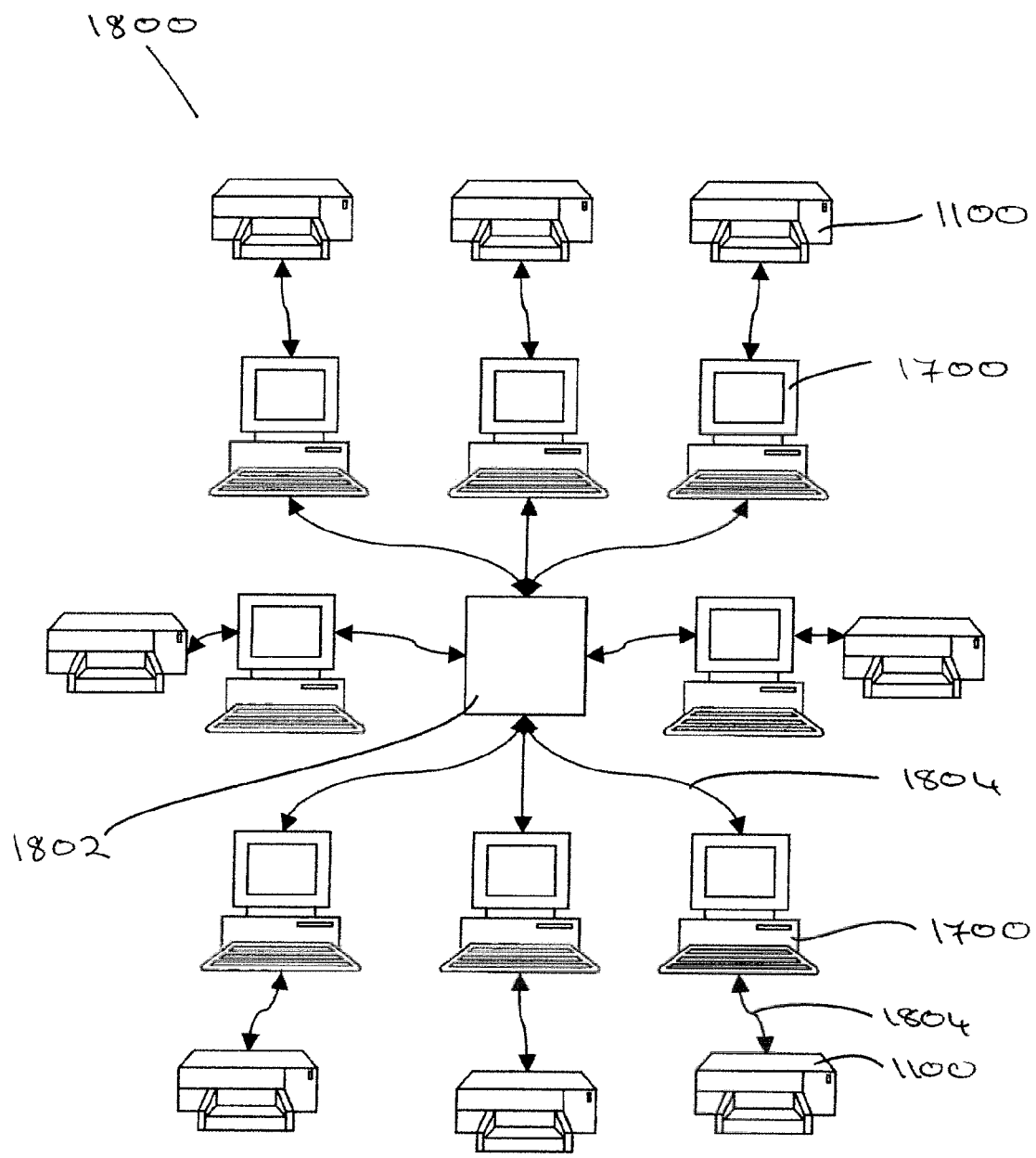
Figure 19A:
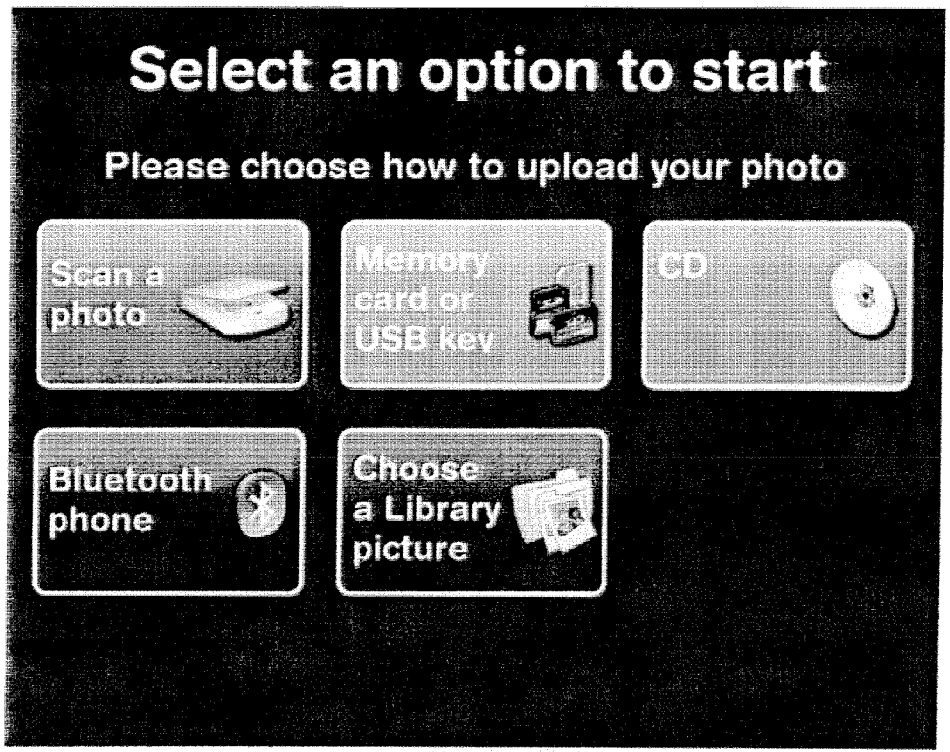
Figure 19B:
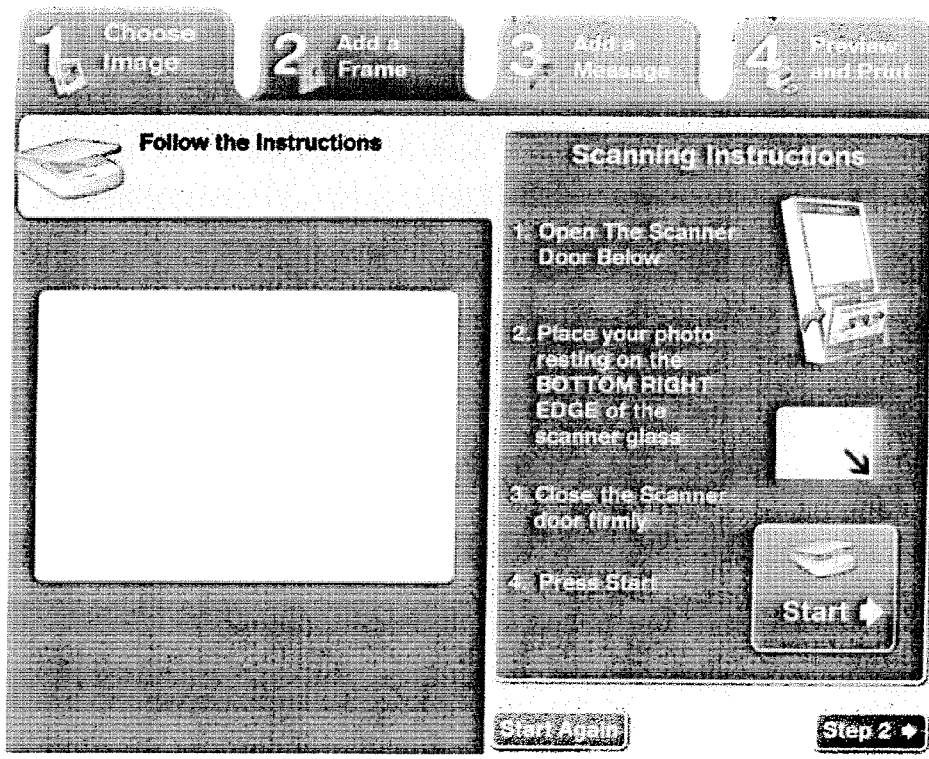
Figure 19C:
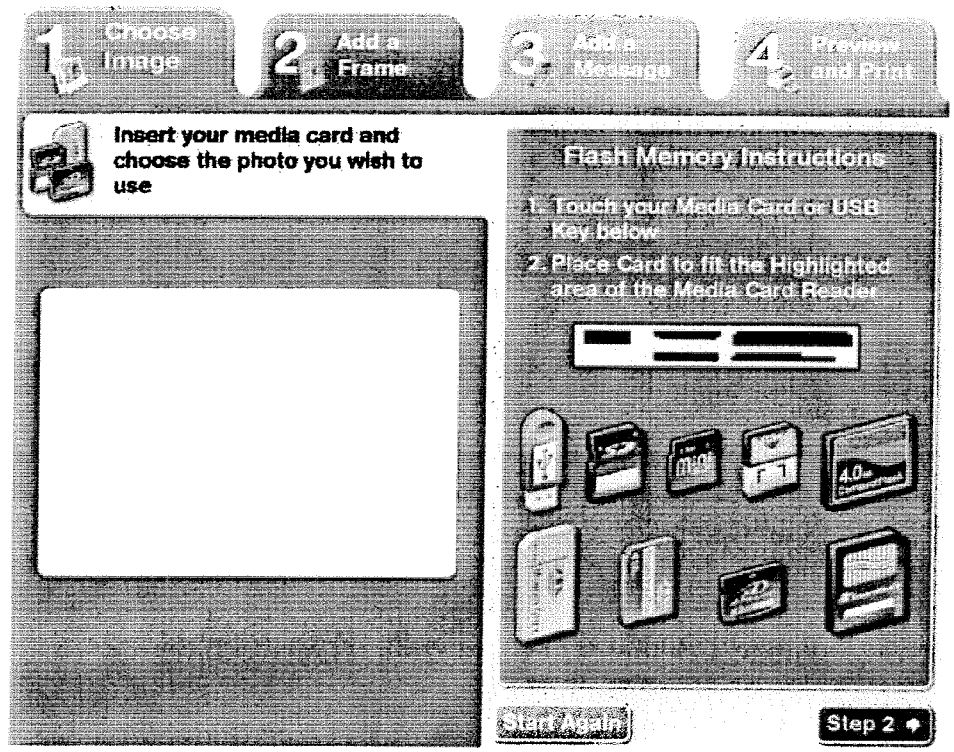
Figure 19D:
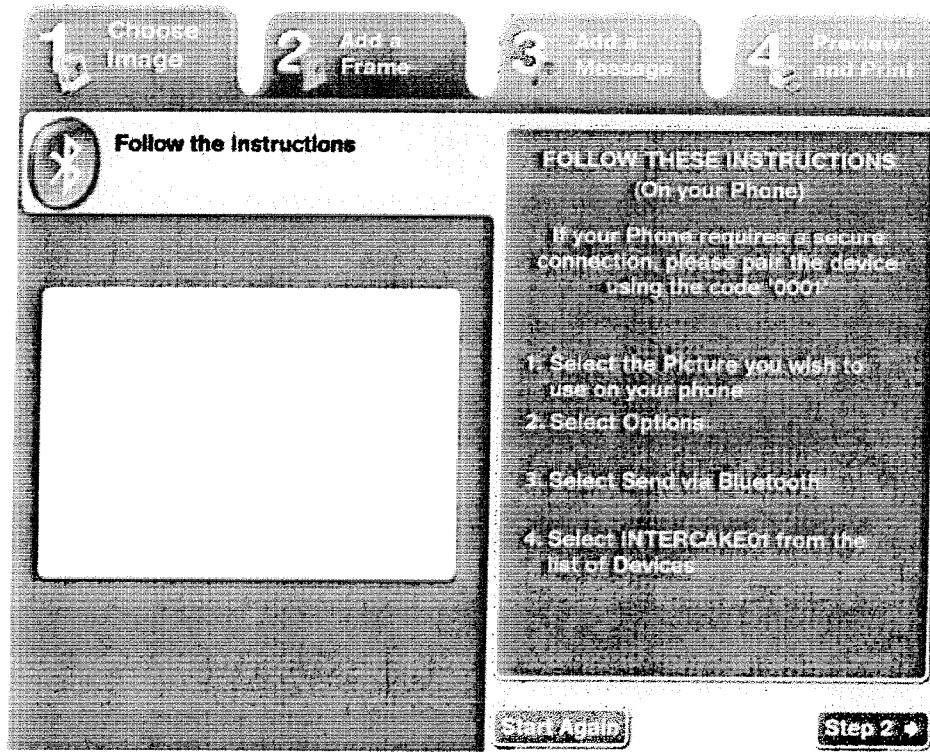
Figure 19E:
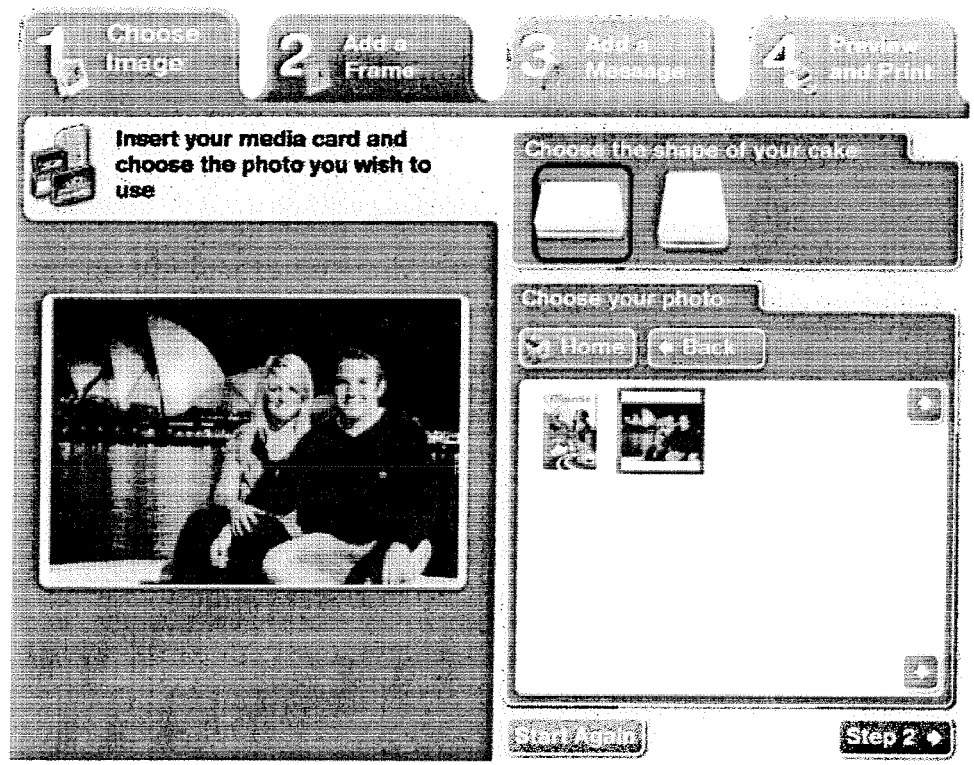
Figure 19F:
Figure 19G:
Figure 19H:
Figure 19I:
Figure 19J:
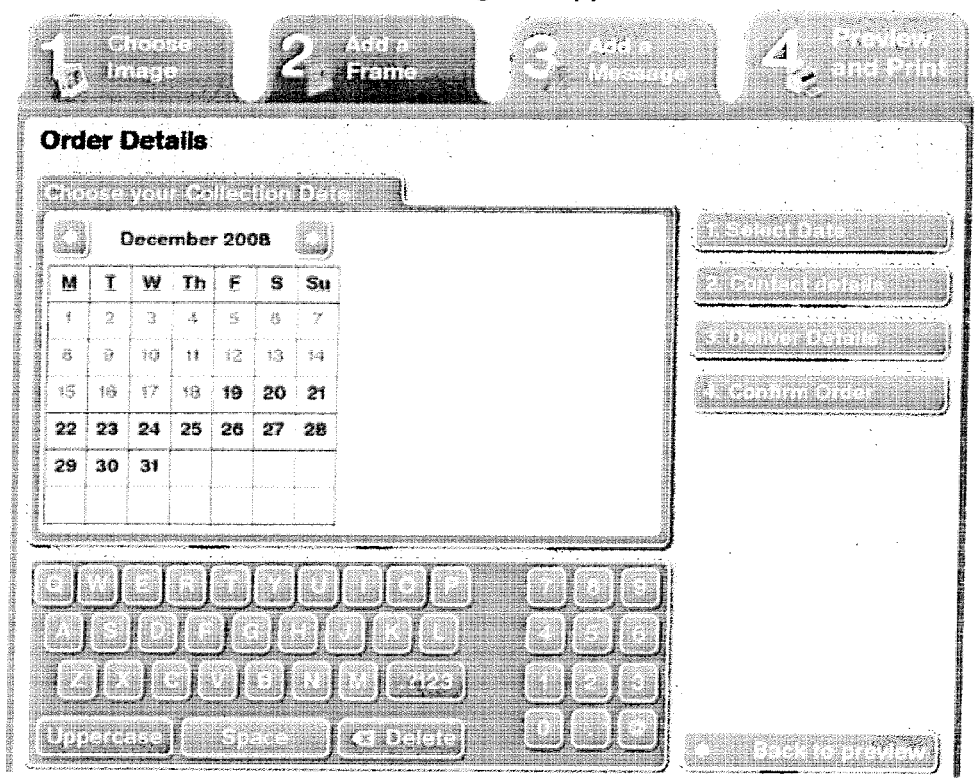
Figure 19K:
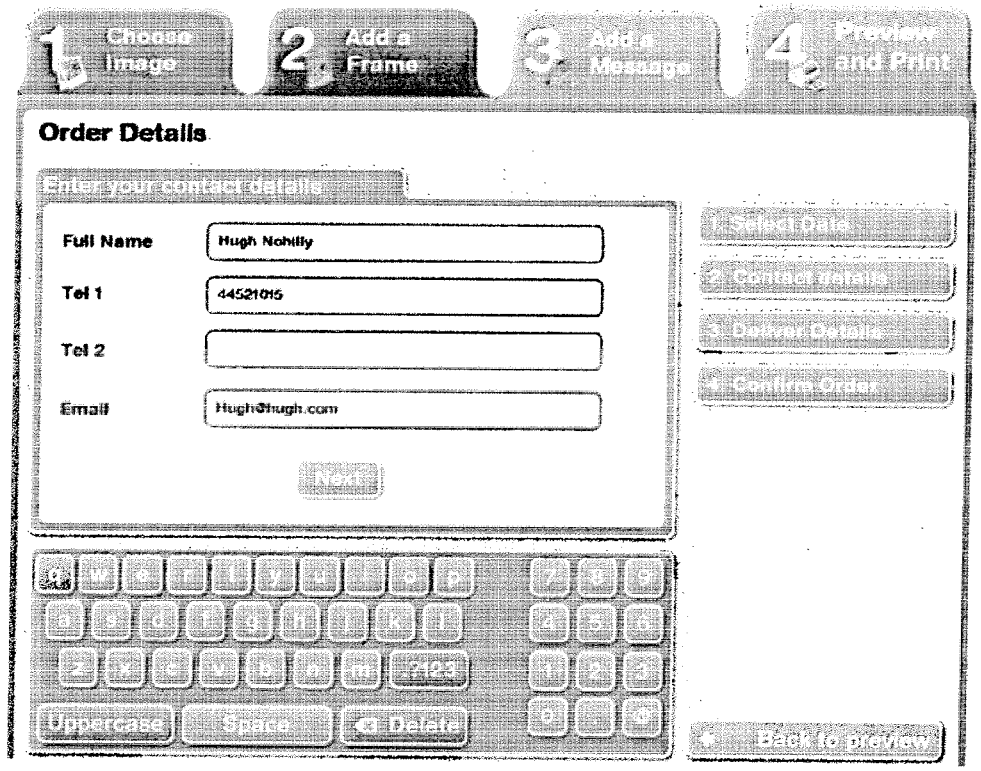
Figure 19L:
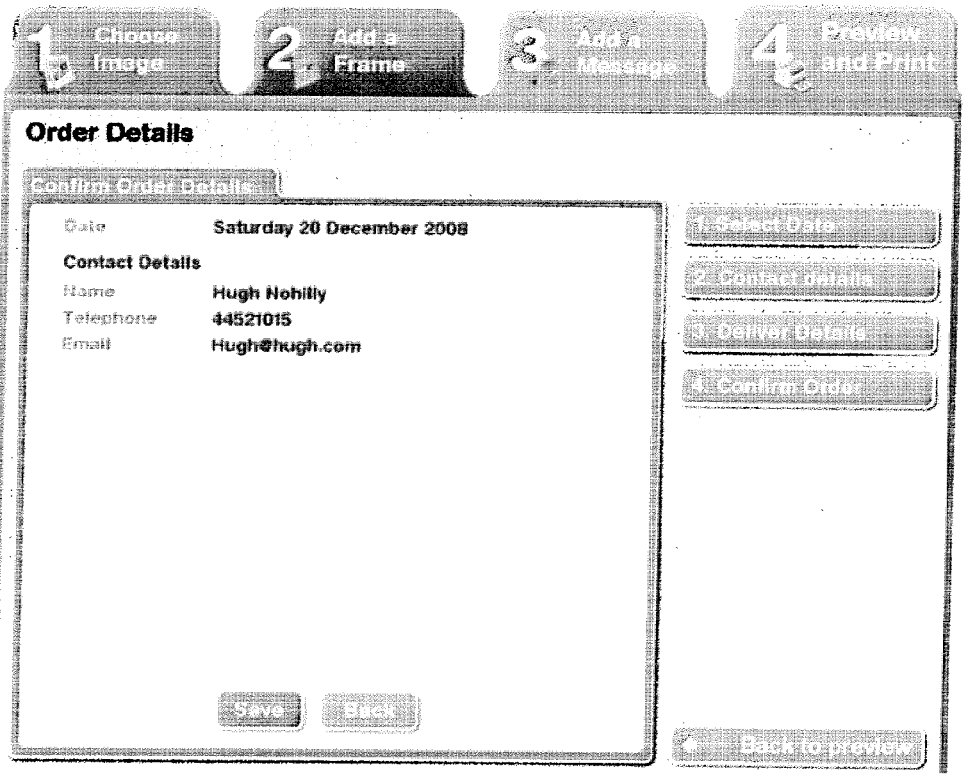
Figure 19M:
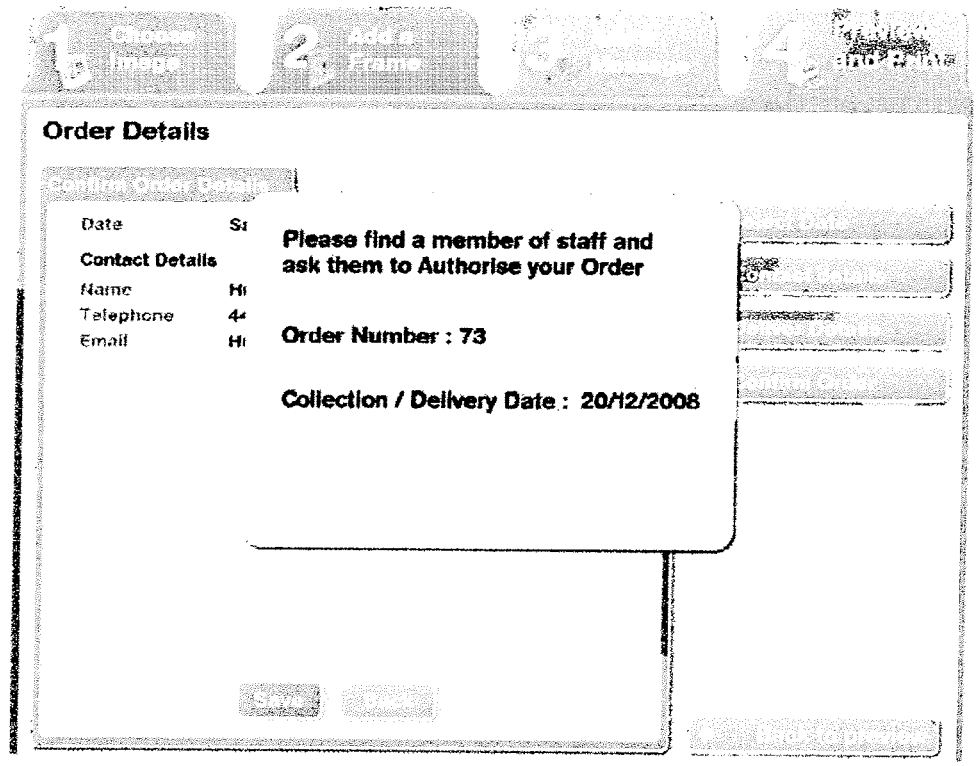
Figure 19N:
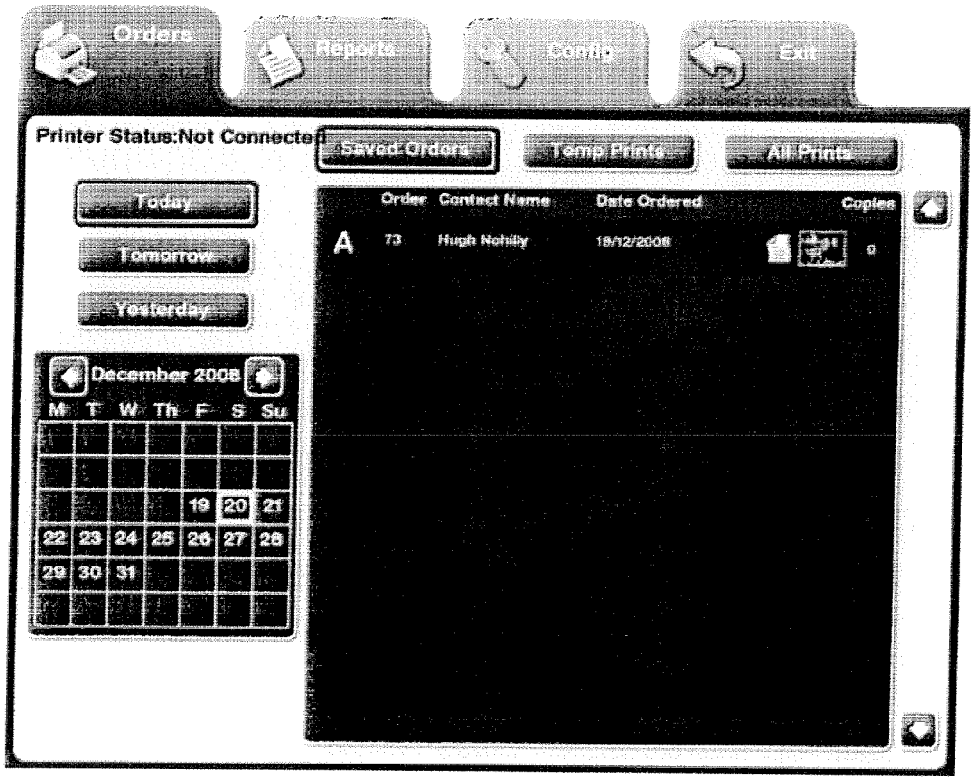
Figure 19O:
Figure 19P:
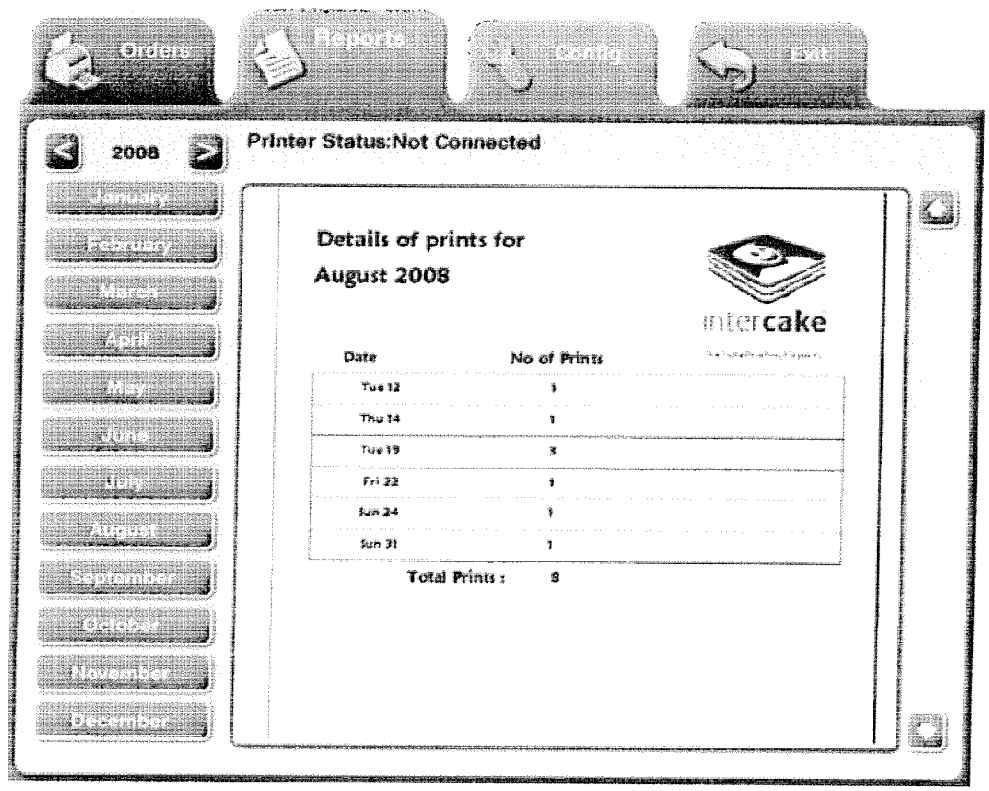
Figure 19Q:
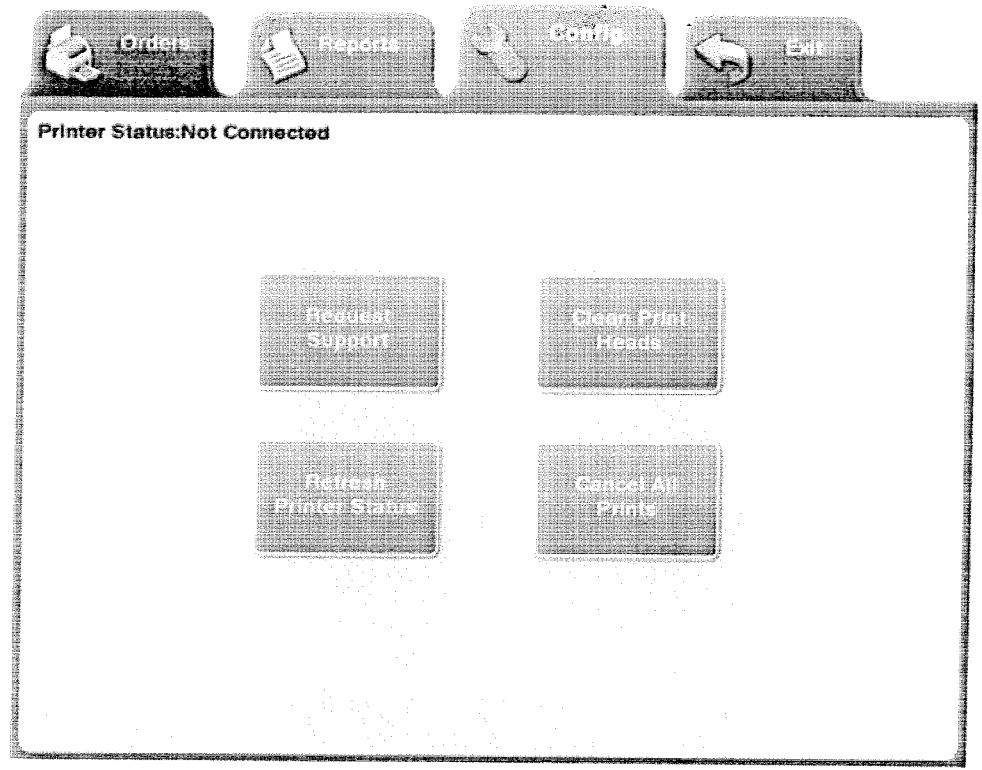
Figure 19R:
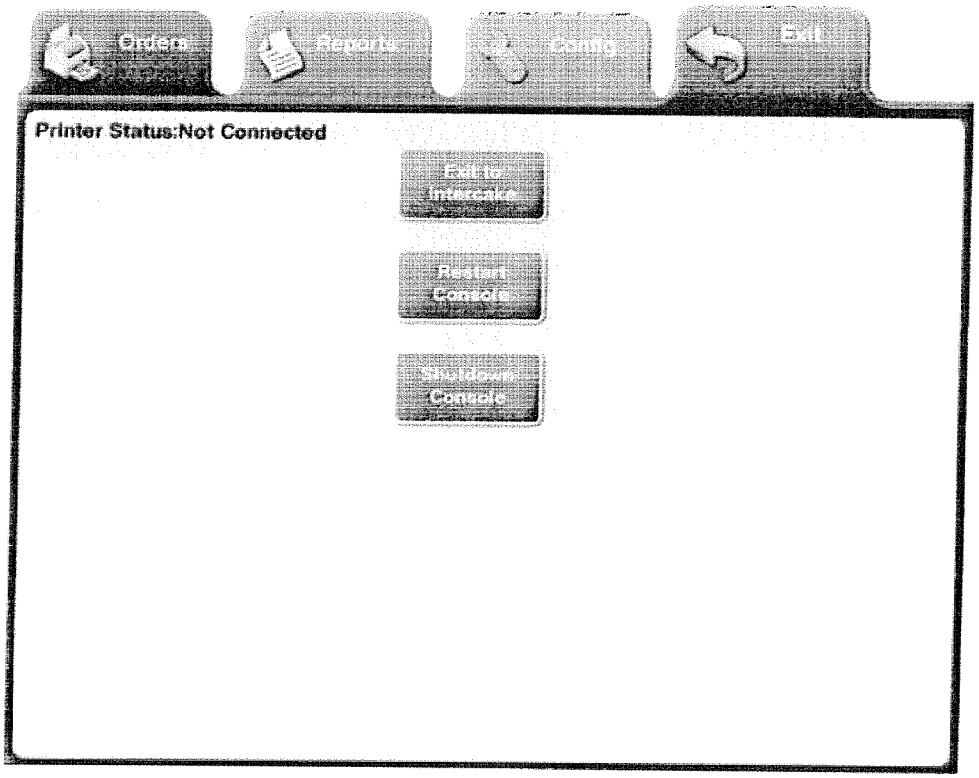
Figure 20:
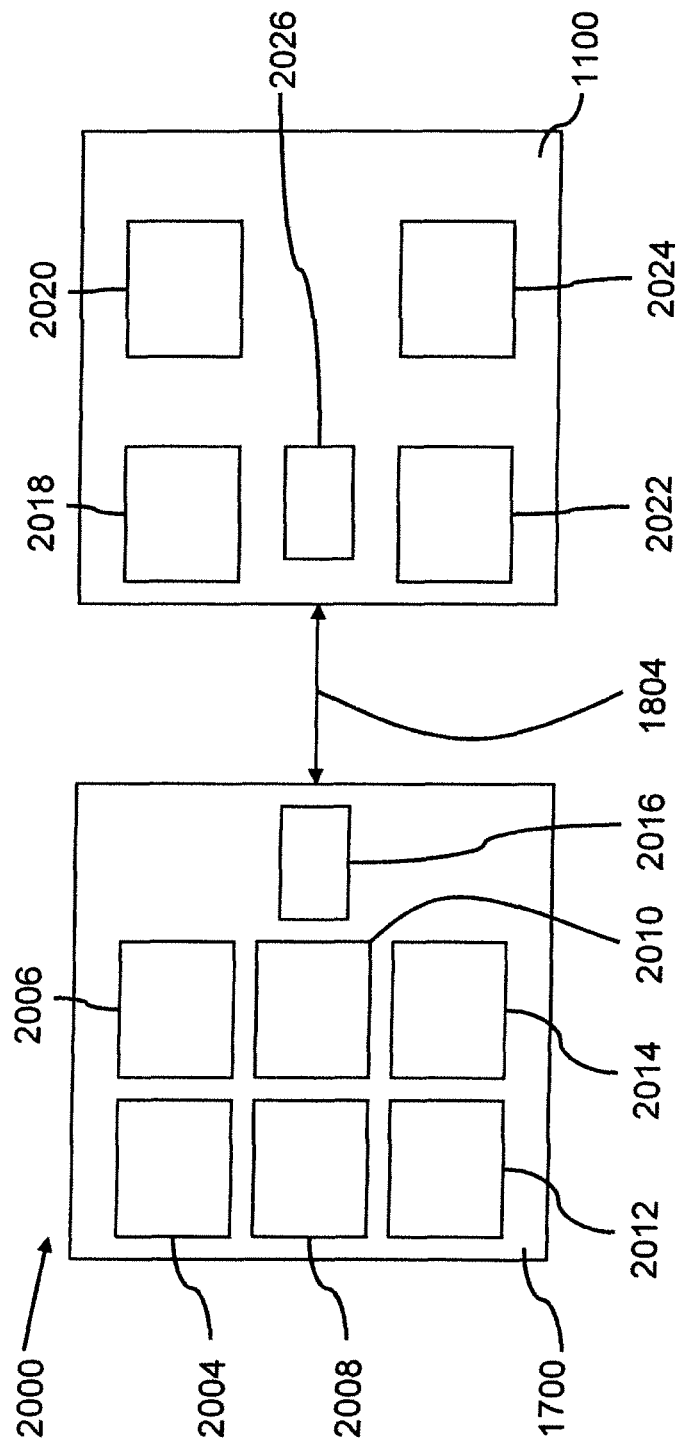
Figure 21:
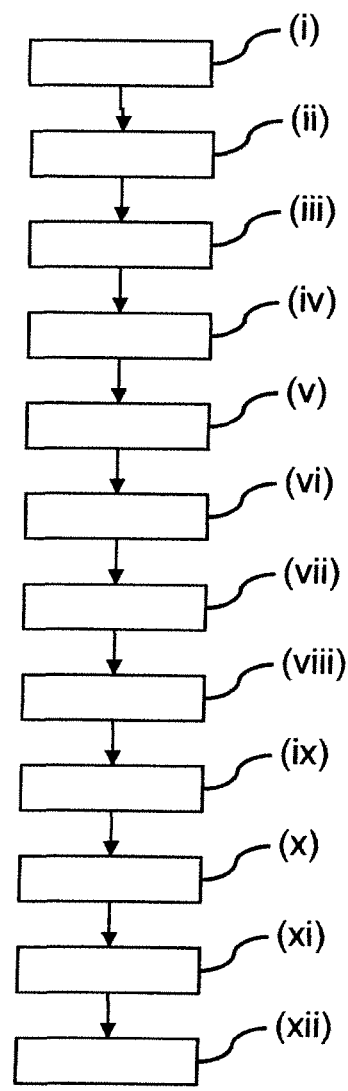

FIGS. 5(a), (b) and (c) are diagrammatic representations of the front, side and rear, respectively, of the roller cleaning apparatus of the invention;

FIG. 6 is a diagrammatic representation of the side view of the print head of the invention;

FIGS. 7(a) and (b) are diagrammatic representations of the top and side, respectively, of an ink reservoir used in the ink delivery system of the invention;

FIG. 8 is a diagrammatic representation of the ink delivery system used in the invention;

FIG. 9 is a diagrammatic representation of the modified paper guide used in the invention;

FIGS. 10(a) and (b) are front and side views, respectively, of a prior art exit tray arrangement;

FIGS. 10(c) and (d) are front and side views, respectively, of an exit tray arrangement according to the invention;

FIG. 11 is a detail perspective view of the inside of the printer according to the invention;

FIG. 12 is a detail perspective view of the printer according to the invention, partially enclosed in its casing;

FIG. 13 is a front view of the printer according to the invention without its casing;

FIG. 14 is a detail perspective view of the ink delivery system according to the invention;

FIG. 15 is a side view of the inside of the printer according to the invention;

FIG. 16 is a perspective view of the printer according to the invention enclosed in its casing;

FIGS. 17(a), (b) & (c) are perspective views of the customer terminal of the invention;

FIG. 18 is a diagrammatic representation of the system according to the invention;

FIGS. 19(a) to 19(r) are screenshots generated by the customer terminal of the system according to the invention; and FIG. 20 is a block diagram of the electronic components of the printing system of the invention; and FIG. 21 is a flowchart illustrating the operation of the method according to the invention.

Figure 1:
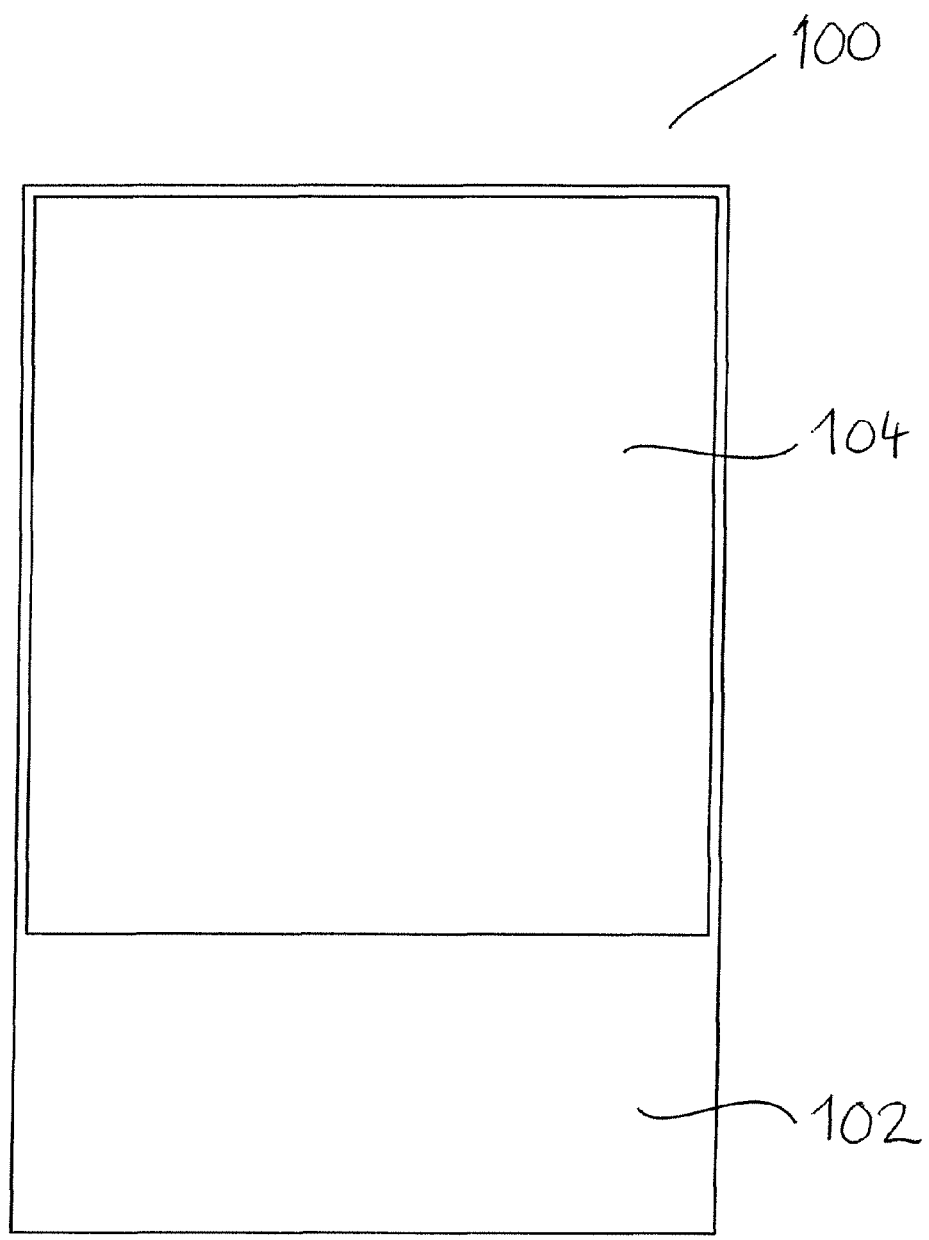
FIG. 1 is a diagrammatic representation of a sheet for use with the device according to the invention.

Referring to the drawings, and initially to FIG. 1 thereof, there is shown a sheet 100 for use with the printer of the invention. The sheet 100 comprises a rectangular backing sheet 102 having a substantially square edible substrate 104 applied thereto. The edible substrate 104 partially covers the backing sheet 102 and is located towards one end of the backing sheet 102, leaving a narrow border of the backing sheet 102 uncovered on three sides of the edible substrate 104, while a larger border is left uncovered at the leading edge of the sheet 100. The uncovered border at the leading edge is typically 5 cm wide.

Figure 2:
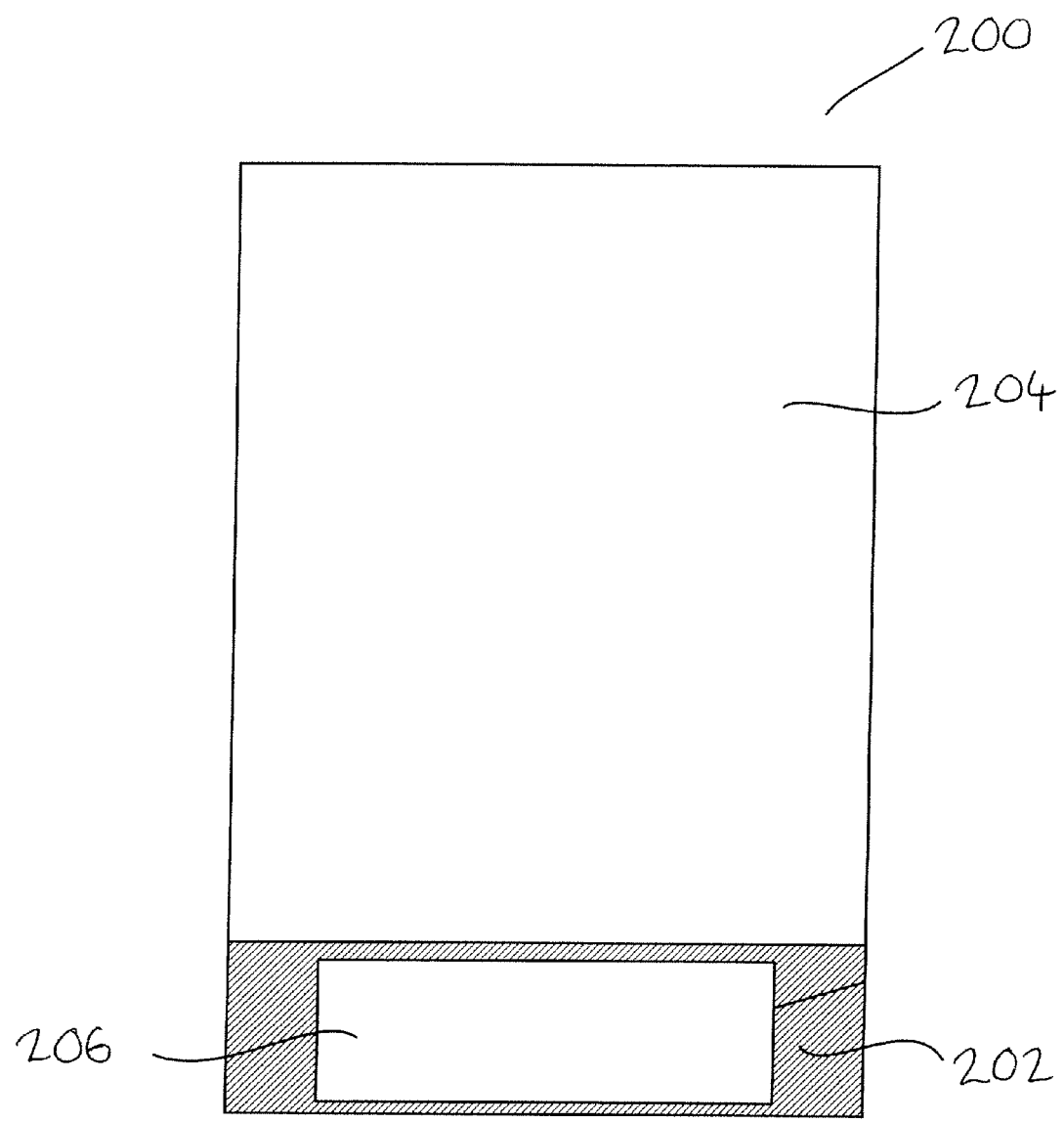
FIG. 2 is a diagrammatic representation of an alternative sheet for use with the device according to an alternative embodiment of the invention.

Referring now to FIG. 2 there is shown an alternative embodiment of sheet 200 for use with the printer of the invention. The sheet 200 comprises a rectangular backing sheet 202 having a substantially square edible substrate 204 applied thereto. The edible substrate 204 partially covers the backing sheet 202 and is located towards one end of the backing sheet 202, leaving a narrow border of the backing sheet 202 uncovered on three sides of the edible substrate 204, while a larger border is left uncovered at the leading edge of the sheet 100. A paper label 206 is applied to the larger border on the sheet 200 adjacent the leading edge thereof. The label 206 is narrower than the backing sheet 202 and the edible substrate 204.

Figure 3:
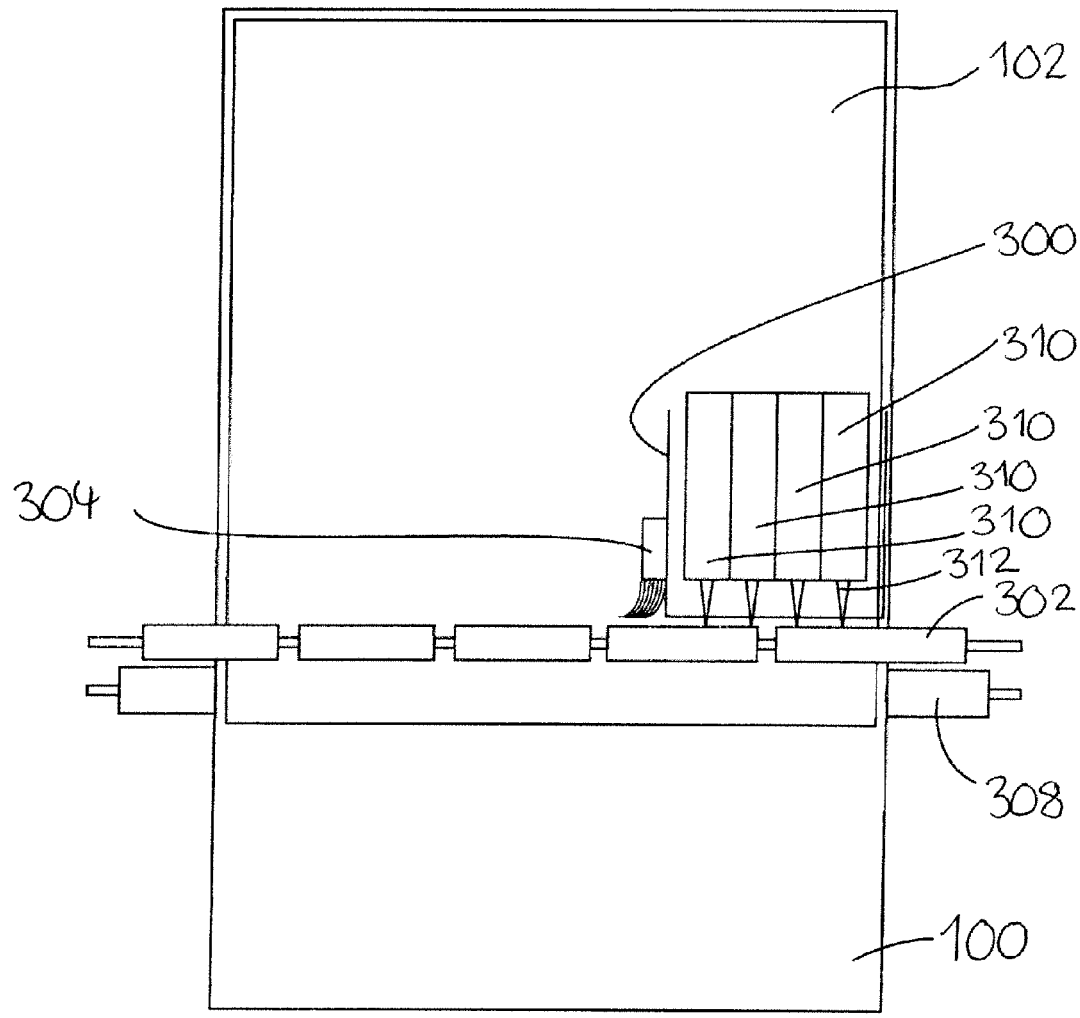
FIG. 3 is a diagrammatic representation of the device according to the invention.

Referring now to FIG. 3 of the drawings, in which like parts have been given the same reference numerals as before, there is shown part of a printer for printing on an edible substrate, comprising a print head 300 mounted adjacent a set of guide rollers 302, which are guiding a sheet 100, comprising an edible substrate 102 through the printer under the print head 300. Mounted on the side of the print head 300 such that it engages with the guide rollers 302, is a roller cleaning apparatus, in this case a brush 304. The brush 304 is fitted to the print head by way of a brush holder (not shown) which allows for easy removal and re-fitting of the brush. This facilitates cleaning and replacement of the brush, for quality control and hygiene purposes. The sheet 100 is guided between the guide rollers 302, which engage the top of the sheet 100, and a further set of lower rollers 308 which engage the bottom of the sheet. The print head comprises four ink cartridges 310, each having a nozzle 312 for supplying ink for printing.

In use, the leading edge of the sheet 100, 200 is fed into the printer and the guide rollers 302 slowly rotate so as to feed the sheet 100, 200 through the printer, under the print head 300. As the sheet 100, 200 moves forwards, the print head 300 reciprocates from side to side, printing a line of the image as it does so. Additionally, for each sideways motion of the print head the brush 304 will sweep against the guide rollers 302, thereby removing any unwanted debris or substrate residue. Only a very small amount of debris is removed by each pass of the brush along the rollers and it will be brushed onto the sheet or down the sides of the feed tray. It will not be noticeable on the resulting image.

Figure 4:
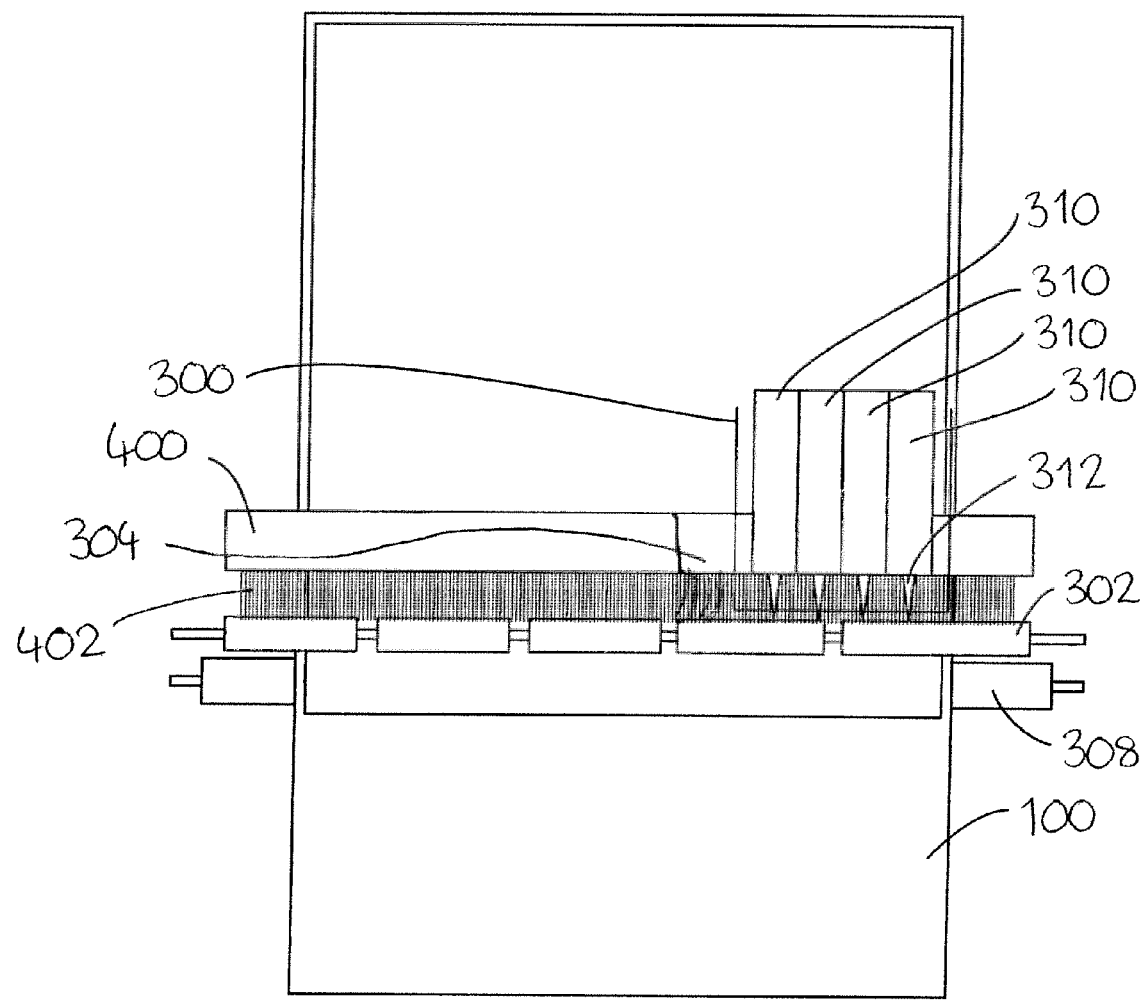
FIG. 4 is a diagrammatic representation of the device according to an alternative embodiment of the invention.

Referring now to FIG. 4, in which like parts have been given the same reference numerals as before, there is shown an alternative embodiment of the printer for printing on an edible substrate comprising an elongated brush 400, which is statically mounted adjacent the guide rollers 302 so that the bristles 402 of elongate brush 400 are in substantially constant engagement with the rollers, and are thereby constantly removing any substrate residue.

Referring now to FIGS. 5(a), (b), (c), in which like parts have been given the same reference numerals as before, there is shown a representation the front, ride and rear, respectively, of the brush 304 of the invention. The brush 304 comprises a handle section 500 which is mounted on a brush body 502, from which a plurality of bristles 504 project. A pair of substantially cuboid, parallel, spaced apart protrusions 506 project rearwardly from the brush body 502.

Referring now to FIG. 6, in which like parts have been given the same reference numerals as before, there is shown a representation of the side of the print head 300, including the guide rollers 302 and lower rollers 308 with a sheet 100, 200 passing therebetween. The guide rollers 302 are supported by a roller bracket 600. The print head 300 comprises a pair of print head mounting brackets 602 for mounting the print head within the printer. The print head 300 further comprises a pair of roller cleaning apparatus receiving apertures 604, which are arranged to receive the protrusions 506 on the rear of the brush body 502 of the brush 304. The brush 304 is mounted on the print head by inserting the protrusions 506 into the apertures 604 and securing the brush 304 in place. The apertures 604 and brush 304, including the protrusions 506 are dimensioned such that when the brush is correctly connected to the print head 300, the bristles 504 thereof will engage the guide rollers 302 of the printer.

Figure 7:
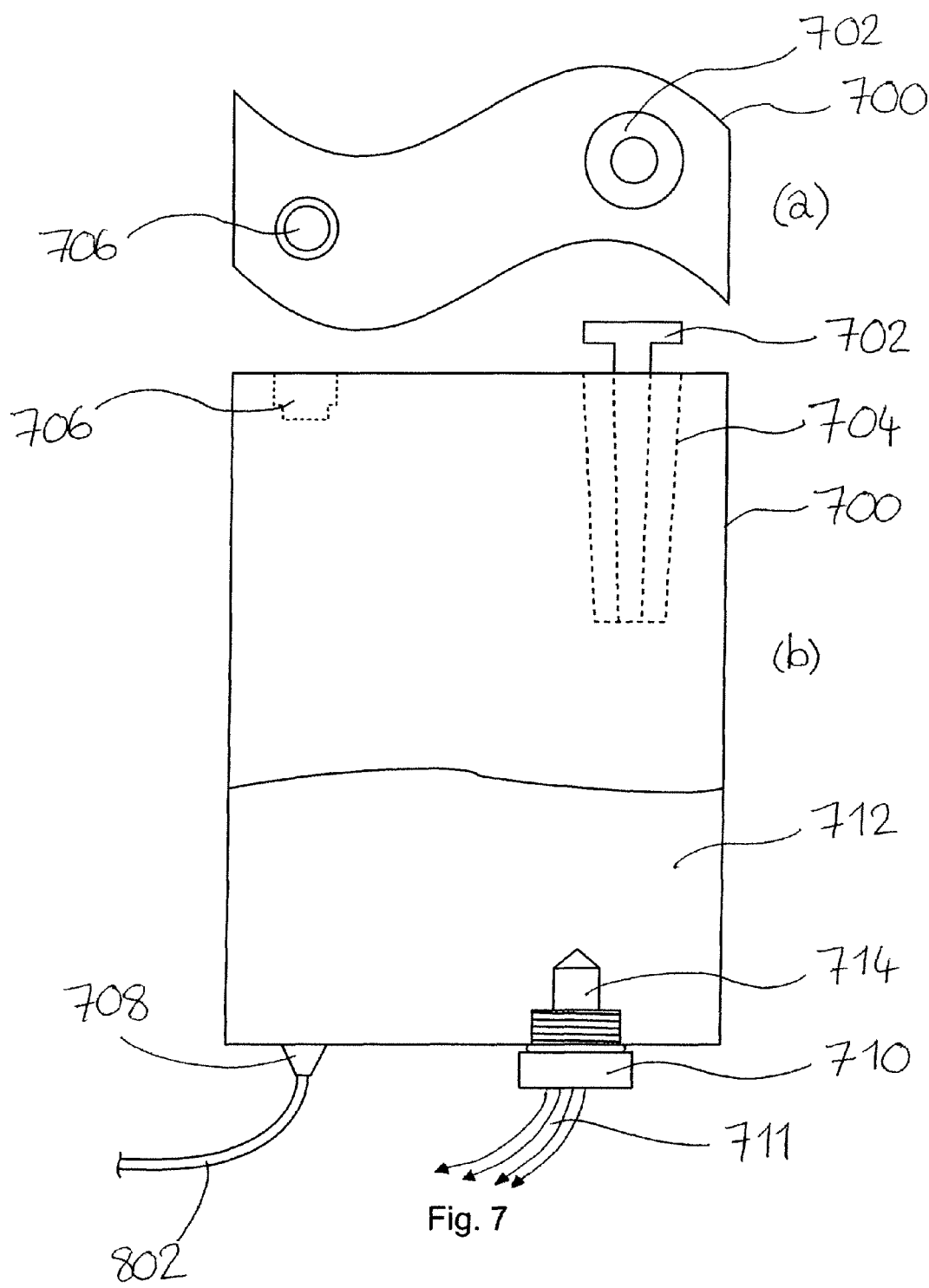

Referring now to FIGS. 7 & 8, in which like parts have been given the same reference numerals as before, there is shown an ink delivery system indicated generally by the reference numeral 800, and an ink reservoir 700 used therein. The ink delivery system 800 is connected to a plurality of ink cartridges 310 fitted in the print head 300. The ink delivery system 800 comprises a plurality of the ink reservoirs 700, each of which is in fluid communication with one of the ink cartridges 310 of the print head 300 by way of a tube 802.

The ink reservoir 700 comprises an air filter 702 which is fitted to an air inlet 704 in the top of the ink reservoir 700. Adjacent the air filter 702 is a refill inlet 706 for replenishing the ink supply. At the base of the ink reservoir 700, a tube 802 is connected to an ink outlet 708. The ink reservoir 700 is fitted with an ink level sensor 710 which is connected to a plurality of wires 711 for transmitting the signals from the ink level sensor 710 regarding the level of ink 712 in the ink reservoir 700. The ink level sensor 710 is an optoelectronic sensor comprising an optical prism 714 which when exposed to light causes the ink level sensor 710 to transmit an ink low signal. In use, when the level of ink 712 is low, the optical prism 714 of the ink level sensor 710 is exposed to light thus causing the ink level sensor 710 to generate an ink low signal.

In use, the ink reservoirs 700 provide a constant supply of the relevant colour ink to each ink cartridge 310 within the print head 300. It is only necessary to ensure that there is sufficient ink within the ink reservoirs 700.

Referring now to FIGS. 9(a) and 9(b), in which like parts have been given the same reference numerals as before, there is shown front and side views of an input paper guide indicated generally by the reference numeral 900. FIG. 9(a) shows a front view of the input paper guide 900 and FIG. 9(b) shows a top view of the input paper guide 900. The input paper guide 900 comprise a flat support section 902 having two enclosing guide sections 904 at each of the two sides of the support section 902. Each guide section 904 extends from the base of the support section 902 to approximately 80% of the way along the support section. The top end of each guide section 904 is slightly chamfered so as to facilitate loading of a sheet 100, 200 of edible substrate. The guide sections 904 and the base section 902 form a semi-enclosed input paper guide 900 for use with a sheet 100, 200 of edible substrate. In this absence of such a guide, the sheet of edible substrate tends to buckle or fold outwards when positioned on the input paper guide. This is due to the fact that the input paper guide tends to be substantially upright and the weight of the sheet of edible substrate itself will cause it to fold. By providing a partial enclosure for the sheet, it will not be able to buckle or fold outwards, thereby reducing paper misfeeds caused by buckling of the sheets.

Referring now to FIGS. 10(a) and 10(b), in which like parts have been given the same reference numerals as before, there is shown a diagrammatic representation of a printer and printer exit tray arrangement. FIG. 10(a) shows a front view of a prior art inkjet printer 1000 having a substantially upright input paper guide 1002, a set of exit rollers 1004 and a substantially horizontal exit paper tray 1006, positioned on the front of the printer 1000, below the exit rollers 1004 and paper outlet of the printer. FIG. 10(b) shows a side view of the printer 1000 in FIG. 10(a), showing the path of a sheet 100, 200 of printable matter through the printer, from the upright input paper guide 1002 down into the printer body, through a pair of paper feed rollers 1007, under the print head 300, out over the exit rollers 1004 and then down onto the exit paper tray 1006. This arrangement is unsuitable for use with a sheet 100, 200 having an edible substrate applied thereto due to the increased rigidity of the edible substrate compared to standard paper. As the edible substrate exits the printer at the exit rollers 1004, it does not bend naturally down to the exit paper tray 1006. Instead, the slightly rigid edible substrate will tend to pivot about the exit rollers, causing the trailing end of the sheet to lift up, within the printer. The trailing end of the sheet of edible substrate will then brush against the print head 300. This results in a reduced quality print as any print that touches against the print head 300 will be smudged. Additionally, the print head 300 itself may be damaged or clogged by coming into contact with the edible substrate in this manner.

Referring now to FIGS. 10(c) and 10(d) in which like parts have been given the same reference numerals as before, there is shown a modified printer and printer exit tray arrangement wherein the substantially horizontal exit paper tray 1006 has been re-positioned on the front of the printer 1000 such that it is positioned adjacent the exit rollers 1004 at substantially the same vertical height as the exit rollers 1004. In this way, as soon as the sheet of the edible substrate passes through the exit rollers 1004 it will rest on the exit paper tray 1006, thereby eliminating any turning moment or pivoting motion that may be developed by the downward movement of the leading edge of the sheet 100, 200 comprising the edible substrate.

Referring now to FIGS. 11 to 16, in which like parts have been given the same reference numerals as before, there is shown an ink-jet printer, indicated generally by the reference numeral 1100, for printing on a sheet having an edible substrate applied thereto. the printer 1100 comprises a plurality of guide rollers 302 for guiding the substrate through the printer 1100 and a print head 300 for printing on the substrate, the print head 300 being mounted adjacent the guide rollers 302 so as to be movable in a reciprocating manner substantially parallel to the guide rollers 302 characterised in that the print head mounts a roller cleaning apparatus 304. The guide rollers 302 are mounted on a roller bracket 1102 which keeps the guide rollers in place.

The brush 304 is mounted on the print head 300 by way of a pair of protrusions 506 on the brush which engage a pair of complementary apertures 604 on the side of the print head.

The print head 300 further comprises four ink cartridges 310 which are connected to the ink delivery system 800. The ink delivery system 800 comprises a plurality of the ink reservoirs 700, each of which is in fluid communication with one of the ink cartridges 310 of the print head 300 by way of a tube 802. Each ink reservoir 700 is fitted with an ink level sensor which is in turn connected to a warning LED 1104, which is illuminated when the sensor detects that the ink level in that ink reservoir 700 is low.

The printer 1100 further comprises a wireless communications unit (not shown) having an aerial 1108 and control electronics having a pair of control buttons 1110. The entire assembly is contained within a food grade metal casing 1106. The printer further comprises an LCD display unit (not shown) connected to the control buttons and control electronics.

The remaining components illustrated in FIGS. 11 to 16 comprise the standard components of an ink-jet printer and, being well known in the art, require no further explanation. In order to modify a standard inkjet printer to form a printer according to the invention it is necessary to remove it from its original the plastic casing; replace the paper feed roller springs with springs of lesser tension; attach the roller cleaning apparatus to the print head; ensure that there is a clear path of movement for the modified print head, this may involve removing some of the standard components or parts thereof within the printer; and finally enclose the entire assembly within a food grade stainless steel housing. Additionally, it may be desirable to fit the printer with additional control electronics and communications equipment.

Referring now to FIGS. 17(a), (b) & (c) there is shown perspective views of an exemplary embodiment of a customer terminal 1700 for use with the system of the invention. The customer terminal 1700 comprises an upper compartment 1702 having touch screen 1703 and a sub-compartment 1704. The upper compartment houses the touch screen 1703 and the main hardware of the customer terminal 1700 including the main processing unit. The sub-compartment 1704 within the upper compartment 1702 houses a scanner (not shown) for scanning a physical photo. The customer terminal 1700 further comprises a middle compartment 1706 and a lower compartment 1708. Each compartment has a compartment door. The middle compartment 1706 comprises a disk drive (not shown) for reception of CD-ROMs and DVDs for the uploading of pictures by the customer. The middle compartment 1706 further comprises ports for reception of USB flash drives and other similar portable memory devices (not shown). The lower compartment 1708 is a display compartment.

Referring now to FIG. 18, in which like in which like parts have been given the same reference numerals as before, there is shown a sample system, indicated generally by the reference numeral 1800, in which the method of the invention may work. The system 1800 comprises a plurality of printers 1100, each of which is connected to a customer terminal 1700, each of which is in turn connected to a remote central server 1802. The connections are made by way of communications links 1804, which may be any form of known communications link.

In use, the printer 1100 described above will be located in a shop or bakery that supplies cakes and the like. Additionally, one or more customer terminals 1700 will be located within the shop and the customer terminal 1700 will be equipped to communicate with the printers. The communication may be wired or wireless depending on the environment, but is preferably wireless as there are hygiene advantages to minimising the cabling in the food processing area and also in reducing the cabling entering the printer 1100 itself. The customer terminal 1700 comprises a communications server, such as an FTP server (not shown) and will transmit images to be printed to the printer while the printer comprises a communications client such as an FTP client and will transmit status information such as number of prints made and ink levels, to the customer terminal 1700.

The customer terminal 1700 is additionally in communication with a remote central server 1802. The customer terminal 1700 will transmit the status information received from the printer 1100 onwards to the remote central server 1802 so as to allow monitoring of supplies to the shop. For example, by analysing the number of prints made by the printer, the remote central server 1802 can judge when it is necessary to deliver more ink supplies or edible substrate supplies to the shop. Additionally, the remote central server 1802 may calculate when it is time to schedule a service for the printer. Furthermore, the information gathered from the printer 1100 may be used in calculating the cost of operating the printer 1100 and like billing matters. Such connectivity between the customer terminal 1700 and a remote central server 1802 will also allow for remote management of the customer terminal 1700 from the remote central server 1802 including allowing for remote software updates, monitoring error messages from the printer and fixing certain problems with the printer.

Furthermore, images for printing may be sent from the remote central server 1802 to the shop. In this way, the a customer in, say, Australia who wished to send a personalised cake to a loved one in Ireland may upload a suitable image to the remote central server 1802 via a special interface on the Internet, the image is then transmitted from the remote central server 1802 to the customer terminal 1700 in a shop in Ireland, the image is printed and the cake is then delivered to its intended recipient.

Images for printing may also be uploaded directly to a customer terminal 1700 in a shop by a customer, from a device, including a Flash memory card, USB memory devices, CDs or DVDs. Each customer terminal 1700, and the Internet interface to the remote central server, is equipped with software to allow a photograph to have features added such as borders and personalised or occasion related greeting to be added before sending the final image to be printed. The customer terminal 1700 may also be equipped with a scanner so that customers create images for their chosen cake using an actual physical photograph. The customer terminal 1700 may be further equipped with Bluetooth or like communication technologies so that images may be transferred directly from a user's mobile phone.

Referring now to FIGS. 19(a) to 19(m) there is shown the screen shots seen by the customer as they use the system of the invention to prepare a cake decorated with an edible substrate bearing a printed image. FIG. 19(a) shows the start screen wherein the customer is asked to select a method of uploading a photo. In FIG. 19(b), the customer has selected to scan a picture and is presented with instructions for scanning an image from a hard copy of a photo. In FIG. 19(c) the customer has selected to upload a picture from flash memory and is presented with instructions for uploading a picture from a portable memory device. In FIG. 19(d) the customer has selected to transmit a photo from his mobile telephone using a Bluetooth connection and is presented with appropriate instructions. In FIG. 19(e) the customer is presented with options to select the desired photo and the shape of the cake. In FIGS. 19(f) and 19(g) the customer has selected a photo and is presented with a number of frame options to apply to that photo, and may also move, rotate or resize their chosen image. In FIG. 19(h), the customer is presented with a touch screen keyboard so as to add a message to the image, if desired. In FIG. 19(i) the customer is presented with a preview of their finalised image and asked to select whether the cake is for collection or delivery. In FIG. 19(j) the customer has selected to collect the cake and is requested to enter the collection date for the cake. In FIG. 19(k) the customer is requested to enter contact details such as name, telephone number and email address. In FIG. 19(l), the customer is presented with the entered order details and requested to confirm that they are correct. In FIG. 19(m) the customer has completed their order, provided with an order number and is requested to contact a member of staff so as to obtain the finalised printed cake.

FIGS. 19(n) to (r) show some of the screens generated in the Administration mode of the customer terminal. FIG. 19(n) shows a list of all the images available for printing. FIG. 19(o) shows a preview of the image to be printed. FIG. 19(p) shows a report of all prints carried out in a certain month. This may be used for billing or similar matters. FIG. 19(q) shows a number of configuration options that are available in the Administration mode including "request Support", "Clean print heads", "Refresh Printer Status" and "Cancel all prints". Finally, FIG. 19(r) shows the options to restart and shutdown the customer terminal.

Referring now to FIG. 20, in which like in which like parts have been given the same reference numerals as before, there is shown the printing system, indicated generally by the reference numeral 2000, in which the method of the invention may work. The printing system 2000 comprises the customer terminal 1700 and the printer 1100, having a communications link 1804 connected therebetween. The communications link 1804 is preferably a WiFi communications link. The customer terminal 1700 comprises a database 2004; image memory 2006; list memory 2008; print queue memory 2010; means for receiving an image to be printed 2012; a communications server 2014, preferably an FTP server; and wireless communications means 2016. The printer comprises a communications client 2018, preferably an FTP client; data entry means 2020, a user interface 2022 having a screen 2024 and wireless communications means 2026, preferably WiFi communications means.

Referring now to FIG. 21, there is shown a flowchart for the operation of the printing method for printing on an edible substrate in the printing system 2000 illustrated in FIG. 20. In step (i), the customer terminal 1700 receives an image to be printed from a customer, via the means for receiving an image to be printed 2012 and assigns a unique ID to that image. In step (ii), the customer terminal 1700 stores the image in image memory 2006; stores the unique ID in the database 2004 and also stores the unique ID in list memory 2008. Preferably, the list memory comprises a txt file having a list of unique IDs. In step (iii), the FTP client on the printer 1100 is continuously monitoring the list memory of the customer terminal by communicating with the FTP server on the customer terminal 1700 and thereby continuously accessing the list memory text file and checking for changes. In step (iv), a customer requests the user, that is a bakery or cake shop employee to print a particular image and informs the user of the unique ID of the desired image. In one embodiment of the invention, the customer terminal 1700 prints the unique ID onto a customer receipt using a thermal printer. In step (v), the user uses data entry means 2020 and a user interface 2022 having a screen 2024 on the printer 1100 to select the desired unique ID from list memory. The printer 1100 accesses the list memory file via FTP and displays the contents thereof on the screen 2024. The user can then scroll through the entries in the list memory 2008 using the data entry means 2020 until the desired unique ID is identified. Preferably, the screen comprises a small LCD display and the data entry means comprise two buttons for scrolling up and down on the LCD display. In step (vi), the communications client 2018 on the printer 1100 copies the desired entry from the list memory 2008 to the print queue memory 2010. The can only be one entry at a time in the print queue memory 2010. Preferably the print queue memory comprises a further text file, accessible via FTP. In step (vii), the FTP server 2018 is continuously monitoring the print queue memory 2010 of the customer terminal 1700 and checking for changes. In step (viii), on noticing the addition of an entry to the print queue memory 2010, the customer terminal 1700 reading the unique ID stored in print queue memory. In step (ix), the FTP server 2018 retrieves the image associated with that unique ID from image memory 2006, by checking the location of in image memory 2006 of the image in the database 2004. In step (x), the customer terminal 1700 transmits the desired image to the printer for printing. In step (xi), the printer prints the image onto an edible substrate.

Finally, in step (xii), the FTP server deletes the unique ID from the print queue memory file, so that it is ready for the next print job.

Throughout the specification, it will be understood that, in relation to printing on edible substrates, the term ink is used to refer to the food colouring that is commonly used in place of the standard ink.

The printer of the invention is preferably housed within a food-grade stainless steel housing, so as to comply with hygiene regulations that may be in place in bakeries or like locations where the printing system of the invention may be installed. This has the added advantage of reducing the amount of dust or other contaminants from its working environment that may infiltrate the printer and affect its operation. Furthermore, the printer is preferably equipped with a wireless communication module or wireless printer server so that the printer can be installed without the need for data cabling. In this way, the installation of the printing system of the invention requires only a conveniently located power supply for the printer's power cable.

In the specification the terms 'comprise', 'comprises', 'comprised' and 'comprising' or any variation thereof and the terms 'include', 'includes', 'included' or 'including' or any variation thereof are considered to be totally interchangeable and they should all be afforded the widest possible interpretation.

The invention is not limited to the embodiment herein described, but may be varied in both construction and detail within the terms of the claims.

The invention claimed is:

1. A printing system for printing on an edible substrate comprising an ink-jet printer for printing on the edible substrate, a remote server and a customer terminal;

the edible substrate ink-jet printer comprising a guide roller for guiding the edible substrate through the edible substrate ink-jet printer and a print head for printing on the edible substrate, the print head being mounted adjacent the guide roller so as to be movable in a reciprocating manner substantially parallel to the guide roller, whereby, the print head mounts a roller cleaning apparatus which engages the guide roller as the print head reciprocates, wherein the roller cleaning apparatus is a brush; and the print head comprises a plurality of ink cartridges with the edible substrate ink-jet printer connected to an ink delivery system which comprises a plurality of ink reservoirs, each of the plurality of ink reservoirs in fluid communication with one ink cartridge by way of a tube respectively; in which at least one ink reservoir comprises an ink level sensor and the ink level sensor is connected to a communications means for transmitting ink level status information and number of prints made status information to the remote server via the customer terminal, with the edible substrate ink-jet printer comprising communications means to receive an image to be printed;

wherein, the remote server is located remotely from the edible substrate ink-jet printer and the customer terminal, the remote server comprising means to receive level status information from the edible substrate ink-jet printer via the customer terminal;

wherein the ink-jet printer is configured to send the ink level status information to the remote server via the customer terminal, and wherein the ink-jet printer is configured to send the number of prints made status information to the remote server via the customer terminal;

wherein, the customer terminal is located remotely from the edible substrate ink-jet printer and the remote server, and, the customer terminal comprises means for receiving the image to be printed and a communications means to transmit the image to be printed to the edible substrate ink-jet printer, the ink-jet printer being configured to send status information to the customer terminal, the status information comprising the ink level status information and the number of prints made status information; and wherein the customer terminal stores the image to be printed on a memory in the customer terminal until the customer terminal receives a command to transmit the image to be printed to the edible substrate ink-jet printer, whereby the command is sent from the edible substrate ink-jet printer, and the customer terminal further comprises a communication means for communicating the status information to the remote server.

2. A printing system as claimed in claim 1 wherein there is a plurality of edible substrate ink-jet printers, a plurality of customer terminals and one remote server, with each of the plurality of customer terminals associated with one of the plurality of edible substrate ink-jet printers respectively; and all of the plurality of customer terminals being connected to the remote server.

* * * * *